US012675553B2

(12) United States Patent
Kneubuehler et al.

(10) Patent No.: US 12,675,553 B2
(45) Date of Patent: Jul. 7, 2026

(54) SIMILARITY DETECTION OF THREE-DIMENSIONAL OBJECT MODELS

(71) Applicant: Roblox Corporation, San Mateo, CA (US)

(72) Inventors: Dario Kneubuehler, Lucerne (CH); Inaki Navarro Oiza, Pfaeffikon (CH); Maurice Kyojin Chu, Redwood City, CA (US)

(73) Assignee: Roblox Corporation, San Mateo, CA (US)

( * ) Notice: Subject to any disclaimer, the term of this patent is extended or adjusted under 35 U.S.C. 154(b) by 57 days.

(21) Appl. No.: 18/795,686

(22) Filed: Aug. 6, 2024

(65) Prior Publication Data

US 2025/0053619 A1    Feb. 13, 2025

Related U.S. Application Data

(60) Provisional application No. 63/531,217, filed on Aug. 7, 2023.

(51) Int. Cl.
| | |
|---|---|
| *G06F 18/2413* | (2023.01) |
| *G06T 15/04* | (2011.01) |
| *G06T 17/20* | (2006.01) |

(52) U.S. Cl.
CPC ........ *G06F 18/24147* (2023.01); *G06T 15/04* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 7,872,648 B2 * | 1/2011 | Hoppe | G06T 9/00 |
| | | | 382/253 |
| 11,321,856 B1 * | 5/2022 | Caldwell | G06T 7/40 |
| 11,701,831 B2 * | 7/2023 | Arad | B33Y 10/00 |
| | | | 264/40.1 |

(Continued)

OTHER PUBLICATIONS

Hanocka, et al., "MeshCNN: a network with an edge", ACM Transactions on Graphics (ToG) 38, No. 4, article 90, Aug. 2019, 12 pages.

(Continued)

*Primary Examiner* — Nurun Flora
(74) *Attorney, Agent, or Firm* — IP Spring

(57) ABSTRACT

Implementations relate to methods, systems, and computer-readable media for performing similarity analysis of three-dimensional (3D) objects. In some implementations, the method includes obtaining a 3D model of the object that includes a mesh and a texture, encoding the mesh into a mesh feature vector using a first neural network, encoding the texture into a texture feature vector using a second neural network, computing a mesh distance between the mesh feature vector and a reference mesh feature vector of a reference object, computing a texture distance between the texture feature vector and a reference texture feature vector of the reference object, determining, based on the mesh distance and the texture distance, whether the object matches the reference object, classifying the object as a dissimilar object if the object does not match the reference object, and classifying the object as a similar object if the object matches the reference object.

20 Claims, 11 Drawing Sheets

(56) References Cited

U.S. PATENT DOCUMENTS

| | | | | |
|---|---|---|---|---|
| 11,941,771 | B2 * | 3/2024 | Abhinav | G06N 3/045 |
| 12,437,541 | B1 * | 10/2025 | Scanlon | G06V 10/70 |
| 2024/0331349 | A1 * | 10/2024 | Wajjala | G06F 18/22 |

OTHER PUBLICATIONS

Qi, et al., "PointNet: Deep learning on point sets for 3d classification and segmentation", In Proceedings of the IEEE conference on computer vision and pattern recognition, 2017, pp. 652-660.

Sharp, et al., "Diffusionnet: Discretization agnostic learning on surfaces", ACM Transactions on Graphics (TOG), 41 (3), 2022, 16 pages.

Vemulapalli, et al., "A compact embedding for facial expressionsimilarity", In Proceedings of the IEEE Conference on Computer Vision and Pattern Recognition, pp. 5683-5692, 2019.

Zhang, et al., "Evolutionary engineering design synthesis of onboard traffic monitoring sensors", Research in engineering design 19, 2008, pp. 113-125.

* cited by examiner

400

Training dataset (Meshes) 410

Point Data Generator 420

Point-wise feature extraction neural network 430

Embedding(s) 440

Classifier 450

Classifier Output 460

550

Mesh Features 555

CNN
Encoder
560

Mean and Standard Deviation of
Model Distribution (Latent Space of
Neural Network)  565

Sampled Vector
570

CNN
Decoder
570

Predicted Mesh 575

SIMILARITY DETECTION OF THREE-DIMENSIONAL OBJECT MODELS

CROSS-REFERENCE TO RELATED APPLICATIONS

This application claims priority to U.S. Provisional Application No. 63/531,217, entitled "MESH DUPLICATION DETECTION USING CONVOLUTIONAL NEURAL NETWORKS," filed on Aug. 7, 2023, the content of which is incorporated herein in its entirety.

TECHNICAL FIELD

Embodiments relate generally to computer-based virtual experiences, and more particularly, to methods, systems, and computer readable media for similarity detection of three-dimensional (3D) object models, and for the detection of counterfeit and/or similar 3D models.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters, 3D objects, and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a computer-implemented method for similarity detection of three-dimensional (3D) object models. The computer-implemented method may include obtaining a three-dimensional (3D) model of an object, where the 3D model includes a mesh comprising a plurality of points each associated with a respective 3D coordinate and a texture, wherein the texture is applied to the mesh to render the object for display, encoding the mesh into a mesh feature vector using a first neural network, encoding the texture into a texture feature vector using a second neural network, computing a mesh distance between the mesh feature vector and a reference mesh feature vector of a reference object model, computing a texture distance between the texture feature vector and a reference texture feature vector of the reference object, determining, based on the mesh distance and the texture distance, whether the object matches the reference object, classifying the object as a dissimilar object if the object does not match the reference object, and classifying the object as a similar object if the object matches the reference object.

In some implementations, the first neural network may include an input layer, a plurality of convolution layers, and one or more fully-connected (FC) layers, where encoding the mesh comprises providing the mesh as input at the input layer, and where the mesh feature vector is obtained as output of a final FC layer of the one or more FC layers.

In some implementations, providing the mesh as input at the input layer may include providing the 3D coordinates of the plurality of points to the input layer where a number of nodes of the input layer is equal to a number of the plurality of points. In some implementations, the mesh feature vector is agnostic to operations that do not alter a shape of the mesh. In some implementations, the operations may include one or more of triangulation, resolution, rotation, translation, scale, subdivision, decimation, and combinations thereof.

In some implementations, the texture is a two-dimensional (2D) image, and the second neural network may include a plurality of layers, where the texture feature vector is obtained from a pre-final layer of the plurality of layers, and where a final layer of the second neural network is configured to output a classification for the texture.

In some implementations, the first neural network may include a mesh classifier, and the computer-implemented method may further include training the mesh classifier, where training the mesh classifier includes providing, as input to the mesh classifier, training data that includes a plurality of reference meshes of training objects and a respective set of labels of different classes associated with each training object, for each training object: generating, based on the mesh of the training object and by the mesh classifier, a respective mesh feature vector, generating, based on the mesh feature vector, one or more predicted labels for the 3D object, and computing a loss value based on comparison of the one or more predicted labels with the label associated with the 3D object, and adjusting one or more parameters of the mesh classifier based on the loss values.

In some implementations, determining whether the object matches the reference object may include calculating an aggregate score based on the mesh distance and the texture distance.

In some implementations, the object is classified as the similar object, and the method further includes comparing a storage footprint of the object and the reference object, and storing, on a storage device of a virtual experience platform, one of the object and the reference object, based on their respective storage footprint.

In some implementations, the object is received from a user account of a virtual experience platform, and subsequent to classifying the object as the similar object, the method further includes transmitting a message to a device associated with the user account, where the message is indicative of similarity of the object to the reference object.

One general aspect includes a non-transitory computer-readable medium with instructions stored thereon, that responsive to execution by a processing device, cause the processing device to perform operations that include obtaining a three-dimensional (3D) model of an object, where the 3D model includes a mesh comprising a plurality of points each associated with a respective 3D coordinate and a texture, wherein the texture is applied to the mesh to render the object for display, encoding the mesh into a mesh feature vector using a first neural network, encoding the texture into a texture feature vector using a second neural network, computing a mesh distance between the mesh feature vector and a reference mesh feature vector of a reference object model, computing a texture distance between the texture feature vector and a reference texture feature vector of the reference object, determining, based on the mesh distance and the texture distance, whether the object matches the reference object, classifying the object as a dissimilar object if the object does not match the reference object, and classifying the object as a similar object if the object matches the reference object. Other embodiments of this aspect include corresponding computer systems, apparatus, and computer programs recorded on one or more computer storage devices, each configured to perform the actions of the methods.

One general aspect includes a system that includes a memory with instructions stored thereon and a processing device, coupled to the memory, the processing device configured to access the memory and execute the instructions, where the instructions cause the processing device to perform operations that may include obtaining a three-dimensional (3D) model of an object, where the 3D model includes a mesh comprising a plurality of points each associated with a respective 3D coordinate and a texture, wherein the texture is applied to the mesh to render the object for display, encoding the mesh into a mesh feature vector using a first neural network, encoding the texture into a texture feature vector using a second neural network, computing a mesh distance between the mesh feature vector and a reference mesh feature vector of a reference object model, computing a texture distance between the texture feature vector and a reference texture feature vector of the reference object, determining, based on the mesh distance and the texture distance, whether the object matches the reference object, classifying the object as a dissimilar object if the object does not match the reference object, and classifying the object as a similar object if the object matches the reference object. Implementations of the described techniques may include hardware, a method or process, or computer software on a computer-accessible medium.

DETAILED DESCRIPTION

Figure 1:
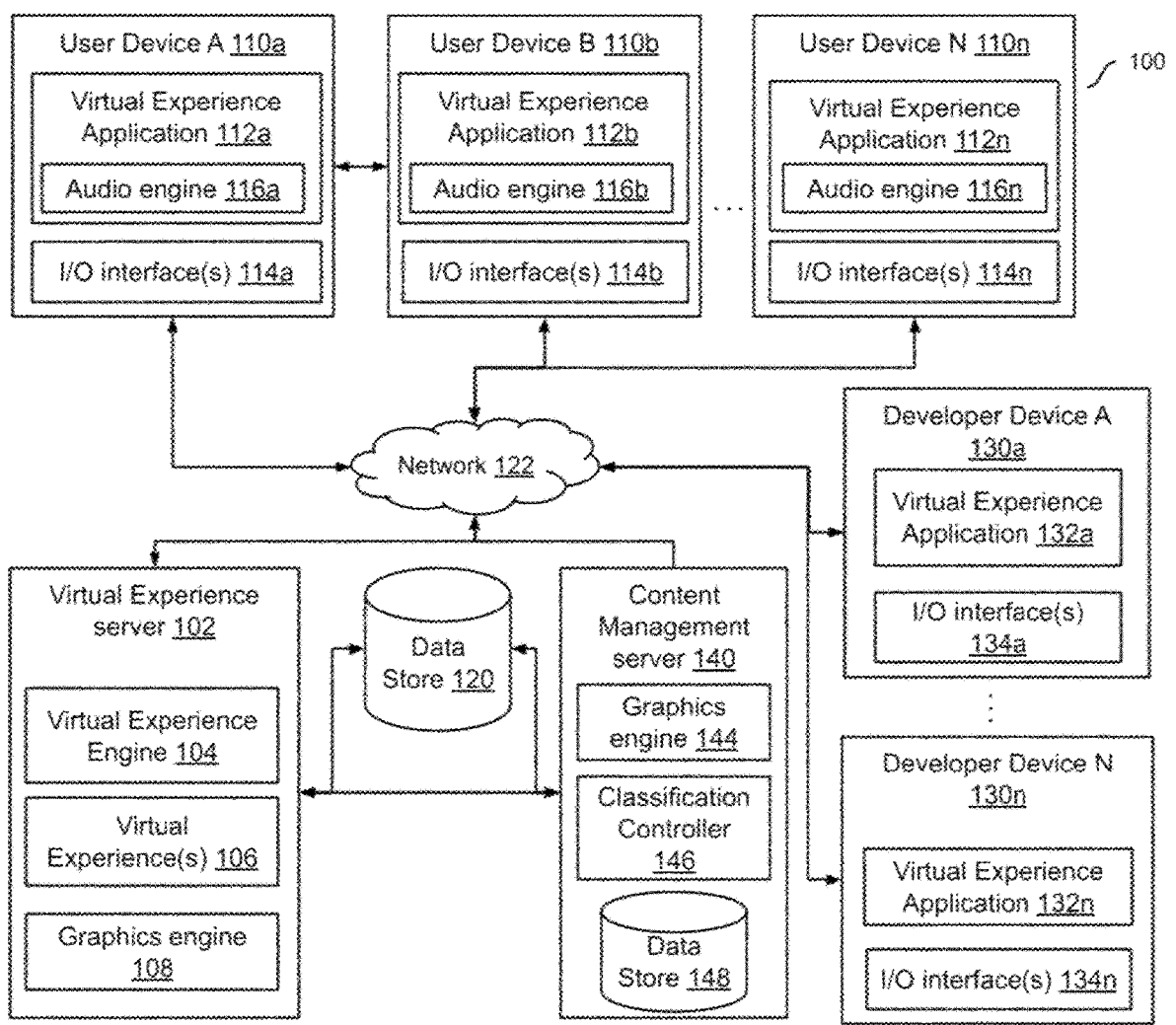
FIG. 1 is a diagram of an example environment in which similarity detection of three-dimensional (3D) models is performed, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online virtual experience platforms (also referred to as "user-generated content platforms" or "user-generated content systems") offer a variety of ways for users to interact with one another. For example, users of an online virtual experience platform may work together towards a common goal, share various virtual experience items, send electronic messages to one another, and so forth. Users of an online virtual experience platform may join virtual experience(s), e.g., games or other experiences as virtual characters, playing specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

A virtual experience platform may enable users (developers) of the platform to create objects, new games, and/or characters. For example, users of the online gaming platform may be enabled to create, design, and/or customize new characters (avatars), new animation packages, new three-dimensional objects, etc. and make them available to other users.

Objects, e.g., virtual objects, may be traded, bartered, or bought and sold in online marketplaces for virtual and/or real currency. A virtual object may be offered within a virtual experience or virtual environment in any quantity, such that there may be a single instance ("unique object"), very few instances ("rare object"), a limited number of instances ("limited quantity"), or unlimited number of instances ("common object") of a particular object within the virtual experience or environment. Permitting an object creator to set a limit of the number of instances of the object can enable creators to charge different prices (e.g., in virtual or real currency) for their creations and allow a virtual economy to emerge where different objects are priced differently.

On some virtual platforms, developer users may upload three-dimensional (3D) object models, e.g., meshes and/or textures of 3D objects, for use in a virtual experience and for trade, barter, or sale on an online marketplace. The models may be modified by other users. The model can include 3D meshes that represent the geometry of the object and include vertices, and define edges, and faces. The model may additionally include textures that define the object surface.

However, since the models are mathematical representations generated from information about the 3D object, e.g., an object mesh that defines an object structure (e.g., shape) and degrees of motion (e.g., rotation, translation, etc.), a texture that defines the surface of the object (e.g., object color, object surface properties such as how light reflects off the object, etc.), and/or other attributes, it may be possible for objects to be copied by other creators or for duplicate/similar objects to exist. In some cases, the model of the object may be modified slightly such that it is no longer an exact copy and can evade commonly employed techniques for duplicate detection. Such copied objects (and/or the associated object models) may be termed inauthentic or counterfeit objects. Counterfeit objects may be copied and redistributed without the reseller's or purchaser's awareness of the counterfeit nature of the virtual object(s). Presence of counterfeit objects may be detrimental to the virtual experience or environment, e.g., since counterfeit objects may be confused by users as being authentic, counterfeit objects may have different properties than an authentic object, etc. and may affect the economy (e.g., value associated with object models, as indicated by a price of the model in a virtual currency) within the virtual experience.

The presence of counterfeit objects and/or object models in the marketplace can be difficult to detect, and the volume and nature of the models can make it difficult for human intervention (manual detection) in the detection of the counterfeit virtual objects, e.g., since human detection may not be scalable beyond a particular point, e.g., when there are millions of models of 3D objects. Users of a virtual experience platform as well as platform providers may thus benefit from techniques to automatically detect counterfeit or inauthentic objects.

In order to sustain an economy of virtual 3D assets, it is important to protect creators of the assets from having their virtual assets copied by others and claiming it as their own. Detecting copies of virtual assets, e.g., 3D objects, avatars, etc., that are represented as 3D meshes (i.e., sets of vertices and polygons) can be particularly challenging since large changes in the discretization of the mesh (which can result in large changes of vertices as well as polygons, e.g. subdivision, decimation) may not actually lead to a large perceptible (user-observable) change of the 3D shape of the asset. For example, large differences in the underlying data representation may have nearly no perceptual difference on what constitutes the virtual asset.

One approach to detecting the similarity of the model is to first render the model of the object, and then perform a similarity analysis of the rendered object with one or more reference objects (e.g., authentic objects). This approach, however, incurs a first computational cost of rendering the object, and then a second computational cost of performing a comparison of the visually rendered object. Timeliness of detection may also be affected due to the time taken to perform the aforementioned comparisons and such detection can be computationally expensive since a render has to be performed for the comparison.

An objective of a virtual experience platform owner or administrator is the mitigation (e.g., removal, blocking, etc.) of counterfeit object models and provide an incentive to creators of original content. A technical problem for operators and/or administrators of virtual experience platforms is automatic, accurate, scalable, cost-effective, and reliable classification of models of 3D objects and detection of inauthentic (counterfeit) models across the platform(s). An additional problem for operators and/or administrators of virtual experience platforms is to optimize and/or conserve storage resources on the platform.

Detection of inauthentic (counterfeit) objects may make it difficult and/or expensive for a creator of an inauthentic model to create and propagate inauthentic models of virtual objects. A virtual experience platform that prevents the upload and/or display of inauthentic objects can effectively deter inauthentic object creators as well as incentivize creators of authentic objects.

In order to circumvent detection, creators may sometimes manipulate an original object to create a manipulated object. The manipulated object may be classified by some counterfeit detection techniques as original, even though the difference between the manipulated object and the genuine (authentic) object may not be perceptible.

Techniques described herein may be utilized to detect whether the perceptual difference is similar between virtual 3D models (e.g., mesh, texture, etc.) assets regardless of an extent of change in their underlying data representation.

Various implementations described herein address the above-described drawbacks by providing techniques to automatically detect models of 3D objects that are similar to reference (e.g., genuine or authentic) models of 3D objects that are known to the game platform. Similarities of meshes and/or textures of a received 3D object to meshes and/or textures of an authentic (original) virtual object are utilized for the classification of 3D models and for the detection of inauthentic models of 3D objects.

Classification of 3D object models and the detection of inauthentic 3D object models pose a number of technical problems and challenges. These include accurate determination of size, orientation, features, texture, etc. of a candidate 3D object model during comparison with authentic 3D object models, which may also be associated with a respective size, orientation, features, texture, etc.

A technical problem for virtual experience platform operators is timely classification of digital assets and the accurate detection of inauthentic digital assets. Another technical problem for virtual experience platform operators is timely identification of 3D object models available on the virtual experience platform that are similar to a candidate 3D object models. Yet another technical problem is the optimal utilization of storage resources. For example, in some scenarios, multiple copies of the same object model and/or multiple near-copies of object models may be stored on the platform, e.g., due to multiple applications operating on the platform. In such a scenario, it may be beneficial to store only one of the multiple versions of an object model.

Implementations are described herein to automatically classify models of 3D objects, identify similar models, identify duplicate models, and/or detect inauthentic models of 3D objects on a virtual experience platform, e.g., a gaming platform.

Various implementations described herein address the aforementioned problems and provide robust techniques to classify models of 3D objects and to detect unauthentic 3D object models that may be imitations of authentic 3D object models. Techniques are described that take into account both the mesh associated with a 3D asset model as well as any associated textures. A vector representation (asset feature vector or asset embedding) of the 3D object model is specified and generated in a manner such that models of 3D objects that are perceptually similar (e.g., to a human viewer) yield asset feature vectors that are close to each other in a vector space, and models of 3D objects that are perceptually dissimilar yield asset feature vectors that are distant from each other in the vector space.

In some implementations, detection of duplicate 3D model assets may include separately performing a comparison of respective mesh geometries and textures, determining a mesh distance (mesh geometric distance) and a texture distance, and subsequently fusing the mesh distance and texture distance to make a determination.

In some implementations, a mesh distance is first computed between the meshes that are being evaluated. In some implementations, the mesh distance is representative of the perceptual distance between the two meshes being compared. In some implementations, a neural network (e.g., a deep neural network) may be utilized to encode the meshes into a compressed lower dimensional space (e.g. a feature vector, embedding, etc.). A suitable distance, e.g., an L2 distance (Euclidean distance), is determined between the respective feature vectors of the two meshes. In some implementations, the L2 distance is representative of differences in human perspective with respect to the shapes corresponding to the meshes. Specifically, the embedding (feature vector) is agnostic to the operations such as triangulation, resolution, rotation, translation, scale, subdivision, decimation, etc. that do not contribute to the perceived shape of the mesh.

In some implementations, a neural network may be trained as a classifier that operates on the mesh. In some implementations, the neural network architecture can include application of convolution operations to the edges of the mesh followed by pooling operations.

In some implementations, the neural network architecture is designed to directly process and analyze point cloud data that is generated based on the vertices of the mesh being analyzed. The neural network is trained to learn an embedding that is agnostic to triangulation by sampling point features from the surface of a mesh.

In some implementations, the neural network architecture includes a diffusion layer that is utilized to train a mesh classification network. The diffusion layer may be applied over the mesh surface to propagate information between vertices of the mesh. To compute the embedding used to calculate the distance metric, an area weighted averaging may be performed over the features of all vertices. The embedding of the internal feature maps may then be utilized to compute a distance between two meshes.

In addition to computing the mesh distance, a texture distance may be computed between any textures associated with the meshes being compared. In some implementations, the texture distance is a perceptual distance metric that is representative of a distance between the two textures of the meshes to be evaluated. In some implementations, a deep neural network, e.g., a convolutional neural network (CNN) may be utilized to compute the texture distance.

In some implementations, a CNN-based image classifier may be trained based on a training set of texture (images). The image classifier may be trained on the image classification task using a cross entropy loss function. The trained image classifier is subsequently utilized to encode candidate textures (textures being analyzed) into a lower dimensional space, and to generate embeddings (feature vectors) that may be utilized to compute a distance, e.g., an L2 distance, between two encoded feature vectors. In some implementations, the distance may be computed based on a pixel space distance technique, e.g., peak signal-to-noise ratio (PSNR), structural similarity index measure (SSIM), etc.

While the neural network is trained as a classifier, during utilization of the neural network architecture to perform a similarity analysis of 3D object models, the classification layer, e.g., a SoftMax layer of the neural network is not utilized. Instead, intermediate feature representations (embeddings) generated by the neural network are utilized to compute a distance between different input models (samples). The distance, e.g., a L2 distance between corresponding textures (a texture distance) or meshes (a mesh distance) is utilized to compare 3D object models.

Explained another way, a trained neural network that is trained as a classifier is utilized for performing comparisons of 3D object models without actually performing a classification. The comparison is performed based on the embeddings generated by the trained classifier by applying the trained classifier to a reference object model and an object model under evaluation, e.g., a newly received or uploaded object model.

Techniques of this disclosure are not dependent on a particular classifier. In various implementations, one or more of different types of classifiers, e.g., a mesh convolutional neural network based classifier, a triplet loss based neural network classifier, a diffusion layer based neural network classifier, etc., may be utilized.

In some implementations, a mesh distance and a texture distance are fused to determine an aggregated metric that is then utilized to make a determination of whether the 3D model assets being compared are similar and/or duplicates.

The combined approach can provide technical advantages over performing only mesh comparisons or only texture comparisons, when applied individually to perform tasks associated with visual similarity. For example, the use of mesh comparisons alone may pose challenges for the capture of abstract visual features such as color, texture, overall visual appearance, etc., which are important for accurately comparing 3D model assets. Mesh comparisons may not fully capture the intricacies of shape and structure, leading to potential inaccuracies in similarity assessment. This may be particularly accentuated for virtual experience platforms, where several assets can be user generated, innovative, and be outside the domain addressed by assets generally used to train machine learning models. Thus, a combination of mesh based comparisons and texture based comparisons may provide superior performance, e.g., speed, accuracy, etc., when compared to approaches to similarity analysis that focus on either of the individual approaches.

Techniques of this disclosure can be utilized to address the limitations of individual approaches (e.g., either mesh based or texture based) and enhance the accuracy and robustness of 3D model asset visual similarity analysis by utilizing a distance fusion approach. The approach leverages the complementary strengths of both approaches and provides a comprehensive representation of perceptual similarity.

The fusion process may include computing pairwise distances between all the assets based on the mesh attributes and the texture attributes separately. To combine these distances, a distance scalar function may be applied to normalize the distances between 0 and 1, e.g., such as min-max scaling.

By combining mesh distances and texture distances using distance fusion, the physical geometric structure (from the mesh) and the visual surface appearance (from the texture) of 3D assets can both be utilized in the analysis, resulting in a comprehensive and accurate representation of perceptual similarity. Various implementations described herein can overcome the limitations of currently available methods and can provide nuanced and precise comparisons, facilitating tasks such as shape retrieval, 3D model search, and content-based recommendation systems.

In some implementations, the fused distance may provide detection of degrees of similarity between candidate 3D object models and authentic 3D object models. For example, clearly similar 3D object models and clearly different 3D object models can be automatically classified, and candidate 3D objects with distance that lie within threshold ranges of distances can be flagged for classification with human inputs. Thresholds can be chosen to ensure that false positives (objects flagged as potential counterfeit, but not counterfeit) as well as false negatives (counterfeit objects that go undetected by the comparison) meet performance requirements (e.g., scalability and reliability).

In some implementations, a texture feature vector for a 3D object may be determined by a trained neural network that has been previously trained to generate feature vectors and/or labels from images. For example, a contrastive learning technique may be utilized wherein an embedding space is learnt by the neural network learns in which similar images stay close to each other in their vector representations (e.g., have a low relative vector distance) while dissimilar images are far apart (e.g., have a high relative vector distance). The method may further include training the neural network with images in a contrastive manner against each other to enable the neural network to learn attributes that are common between data classes (e.g., labels) and attributes that set apart a data class from another.

Various implementations described herein can perform similarity analysis and classify 3D object models. For example, when a candidate 3D object model, e.g., a mesh of a 3D object, is newly uploaded by a user to the platform, it may be determined whether the candidate 3D object model is substantially identical to an authentic object model already available on the platform. In some scenarios, duplicate 3D object models may not be permitted to be uploaded and/or stored on the platform.

As another example, similarity analysis may be performed to determine a set of 3D object models, e.g., meshes, textures, etc., to be suggested to a user based on a 3D object model that is purchased and/or selected by a user. The set of 3D object models may be suggested based on a determination of which 3D objects on the platform are visually similar to the already purchased 3D object model.

In some implementations, the embedding space of the classifier may be indicative of progressive differences in the mesh geometry and/or texture. The magnitude of a difference between the embeddings is a measure of the difference between two 3D object models with respect to their geometries and/or textures. The measure of the difference can further be utilized to quantify the uniqueness of 3D objects.

FIG. 1 is a diagram of an example environment in which similarity detection of three-dimensional (3D) models is performed, in accordance with some implementations. FIG. 1 and other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online virtual experience server 102, data store 120, user devices 110a, 110b, and 110n (generally referred to as "user device(s) 110" herein), and developer devices 130a and 130n (generally referred to as "developer device(s) 130" herein), virtual experience server 102, content management server 140, data store 120, user devices 110, and developer devices 130 are coupled via network 122. In some implementations, user devices(s) 110 and developer device(s) 130 may refer to the same or same type of device.

Online virtual experience server 102 can include a virtual experience engine 104, one or more virtual experience(s) 106, and graphics engine 108. A user device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc. The input/output devices can also include accessory devices that are connected to the user device by means of a cable (wired) or that are wirelessly connected.

Content management server 140 can include a graphics engine 144, and a classification controller 146. In some implementations, the content management server may include a plurality of servers. In some implementations, the plurality of servers may be arranged in a hierarchy, e.g., based on respective prioritization values assigned to content sources.

Graphics engine 144 may be utilized for the rendering of one or more objects, e.g., 3D objects associated with the virtual environment. Classification controller 146 may be utilized to classify assets such as 3D objects and for the detection of inauthentic digital assets, etc. Data store 148 may be utilized to store a search index, model information, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, a cloud storage system, or another type of component or device capable of storing data. The data store 120 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, a distributed computing system, a cloud computing system, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on user devices 110.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be an online gaming server. For example, the virtual experience server may provide single-player or multiplayer games to a community of users that may access or interact with games using user devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using user devices (e.g., 110) within a game (e.g., game that is part of virtual experience 106) or the presentation of the interaction on a display or other output device (e.g., 114) of a user device 110.

In some implementations, a virtual experience 106 can include an electronic file that can be executed or loaded using software, firmware or hardware configured to present the game content (e.g., digital media item) to an entity. In some implementations, a virtual experience application 112 may be executed and a virtual experience 106 executed in connection with a virtual experience engine 104. In some implementations, a virtual experience (e.g., a game) 106 may have a common set of rules or common goal, and the environment of a virtual experience 106 shares the common set of rules or common goal. In some implementations, different games may have different rules or goals from one another.

In some implementations, virtual experience(s) may have one or more environments (also referred to as "gaming environments" or "virtual environments" herein) where multiple environments may be linked. An example of an environment may be a three-dimensional (3D) environment. The one or more environments of a virtual experience application 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 102 can host one or more virtual experiences 106 and can permit users to interact with the virtual experiences 106 using a virtual experience application 112 of user devices 110. Users of the online virtual experience server 102 may play, create, interact with, or build virtual experiences 106, communicate with other users, and/or create and build objects (e.g., also referred to as "item(s)" or "game objects" or "virtual game item(s)" herein) of virtual experiences 106. For example, in generating user-generated virtual items, users may create characters, decoration for the characters, one or more virtual environments for an interactive game, or build structures used in a game. In some implementations, users may buy, sell, or trade virtual game objects, such as in-platform currency (e.g., virtual currency), with other users of the online virtual experience server 102. In some implementations, online virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience server 102 or virtual experience applications. In some implementations, game objects (e.g., also referred to as "item(s)" or "objects" or "virtual objects" or "virtual game item(s)" herein) may refer to objects that are used, created, shared or otherwise depicted in virtual experience applications 106 of the online virtual experience server 102 or virtual experience applications 112 of the user devices 110. For example, game objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration, rather than limitation. In some implementations, online virtual experience server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual application 106 may be associated with a particular user or a particular group of users (e.g., a private game), or made widely available to users with access to the online virtual experience server 102 (e.g., a public game). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or user devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the game (e.g., rendering commands, collision commands, physics commands, etc.) In some implementations, virtual experience applications 112 of user devices 110, may work independently, in collaboration with virtual experience engine 104 of online virtual experience server 102, or a combination of both.

In some implementations, both the online virtual experience server 102 and user devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of user device 110. In some implementations, each virtual application 106 may have a different ratio between the virtual experience engine functions that are performed on the online virtual experience server 102 and the virtual experience engine functions that are performed on the user devices 110. For example, the virtual experience engine 104 of the online virtual experience server 102 may be used to generate physics commands in cases where there is a collision between at least two virtual application objects, while the additional virtual experience engine functionality (e.g., generate rendering commands) may be offloaded to the user device 110. In some implementations, the ratio of virtual experience engine functions performed on the online virtual experience server 102 and user device 110 may be changed (e.g., dynamically) based on gameplay conditions. For example, if the number of users participating in gameplay of a particular virtual application 106 exceeds a threshold number, the online virtual experience server 102 may perform one or more virtual experience engine functions that were previously performed by the user devices 110.

For example, users may be playing a virtual application 106 on user devices 110, and may send control instructions (e.g., user inputs, such as right, left, up, down, user election, or character position and velocity information, etc.) to the online virtual experience server 102. Subsequent to receiving control instructions from the user devices 110, the online virtual experience server 102 may send gameplay instructions (e.g., position and velocity information of the characters participating in the group gameplay or commands, such as rendering commands, collision commands, etc.) to the user devices 110 based on control instructions. For instance, the online virtual experience server 102 may perform one or more logical operations (e.g., using virtual experience engine 104) on the control instructions to generate gameplay instruction(s) for the user devices 110. In other instances, online virtual experience server 102 may pass one or more or the control instructions from one user device 110 to other user devices (e.g., from user device 110a to user device 110b) participating in the virtual application 106. The user devices 110 may use the gameplay instructions and render the gameplay for presentation on the displays of user devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a user device 110 to another user device (e.g., from user device 110b to user device 110n), where the other user device generates gameplay instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a user device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online virtual experience server 102 may store characters created by users in the data store 120. In some implementations, the online virtual experience server 102 maintains a character catalog and game catalog that may be presented to users. In some implementations, the game catalog includes images of virtual experiences stored on the online virtual experience server 102. In addition, a user may select a character (e.g., a character created by the user or other user) from the character catalog to participate in the chosen game. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the virtual experience platform may support three-dimensional (3D) objects that are represented by a 3D model and includes a surface representation used to draw the character or object (also known as a skin or mesh) and a hierarchical set of interconnected bones (also known as a skeleton or rig). The rig may be utilized to animate the object and to simulate motion of the object. The 3D model may be represented as a data structure, and one or more parameters of the data structure may be modified to change various properties of the character, e.g., dimensions (height, width, girth, etc.); shape; movement style; number/ type of parts; proportion, etc.

In some implementations, the 3D model may include a 3D mesh. The 3D mesh may define a three-dimensional structure of the unauthenticated virtual 3D object. In some implementations, the 3D mesh may also define one or more surfaces of the 3D object. In some implementations, the 3D object may be a virtual avatar, e.g., a virtual character such as a humanoid character, an animal-character, a robot-character, etc.

In some implementations, the mesh may be received (imported) in a FBX file format. The mesh file includes data that provides dimensional data about polygons that comprise the virtual 3D object and UV map data that describes how to attach portions of texture to various polygons that comprise the 3D object. In some implementations, the 3D object may correspond to an accessory, e.g., a hat, a weapon, a piece of clothing, etc. worn by a virtual avatar or otherwise depicted with reference to a virtual avatar.

In some implementations, a platform may enable users to submit (upload) candidate 3D objects for utilization on the platform. A virtual experience development environment (developer tool) may be provided by the platform, in accordance with some implementations. The virtual experience development environment may provide a user interface that enables a developer user to design and/or create virtual experiences, e.g. games. The virtual experience development environment may be a client-based tool (e.g., downloaded and installed on a client device, and operated from the client device), a server-based tool (e.g., installed and executed at a server that is remote from the client device, and accessed and operated by the client device), or a combination of both client-based and service-based elements.

The virtual experience development environment may be operated by a developer of a virtual experience, e.g., a game developer or any other person who seeks to create a virtual experience that may be published by an online virtual experience platform and utilized by others. The user interface of the virtual experience development environment may be rendered on a display screen of a client device, e.g., such as a developer device 130 described with reference to FIG. 1, so as to enable the creator/developer to interact with the development environment using actions such as typing, highlighting, selecting, drag and drop, clicking, and so forth via a mouse, keyboard, or other input device configured to communicate with the user interface. The user interface may include a menu bar, a tool bar, a workspace pane, and a plurality of secondary panes. Depending on the particular implementation, the user interface may include alternative or additional elements, arrangements, operational features, etc. of the virtual experience development environment than what is shown and described herein.

A developer user (creator) may utilize the virtual experience development environment to create virtual experiences. As part of the development process, the developer/creator may upload various types of digital content such as object files (meshes), image files, audio files, short videos, etc., to enhance the virtual experience.

In implementations where the candidate (unauthenticated) 3D object is an accessory, data indicative of use of the object in a virtual experience may also be received. For example, a "shoe" object may include annotations indicating that the object can be depicted as being worn on the feet of a virtual humanoid character, while a "shirt" object may include annotations that it may be depicted as being worn on the torso of a virtual humanoid character.

In some implementations, the 3D model may further include texture information associated with the 3D object. For example, texture information may indicate color and/or pattern of an outer surface of the 3D object. The texture information may enable varying degrees of transparency, reflectiveness, degrees of diffusiveness, material properties, and refractory behavior of the textures and meshes associated with the 3D object. Examples of textures include plastic, cloth, grass, a pane of light blue glass, ice, water, concrete, brick, carpet, wood, etc.

In some implementations, the user device(s) 110 may each include computing devices such as personal computers (PCs), mobile devices (e.g., laptops, mobile phones, smart phones, tablet computers, or netbook computers), network-connected televisions, gaming consoles, etc. In some implementations, a user device 110 may also be referred to as a "client device." In some implementations, one or more user devices 110 may connect to the online virtual experience server 102 at any given moment. It may be noted that the number of user devices 110 is provided as illustration. In some implementations, any number of user devices 110 may be used.

In some implementations, each user device 110 may include an instance of the virtual experience application 112, respectively. In one implementation, the virtual experience application 112 may permit users to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to user device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

In some implementations, the virtual experience application may include an audio engine 116 that is installed on the user device, and which enables the playback of sounds on the user device. In some implementations, audio engine 116 may act cooperatively with audio engine 144 that is installed on the sound server.

According to aspects of the disclosure, the virtual experience application may be an online virtual experience server application for users to build, create, edit, upload content to the online virtual experience server 102 as well as interact with online virtual experience server 102 (e.g., participate in virtual experiences 106 hosted by online virtual experience server 102). As such, the virtual experience application may be provided to the user device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual game hosted by online virtual experience server 102, or view or upload content, such as games 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a virtual experience program) that is installed and executes local to user device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or play games 106 hosted by online virtual experience server 102). As such, the virtual experience application may be provided to the user device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual applications 106 developed, hosted, or provided by a virtual experience application developer.

In some implementations, a user may login to online virtual experience server 102 via the virtual experience application. The user may access a user account by providing user account information (e.g., username and password) where the user account is associated with one or more characters available to participate in one or more games 106 of online virtual experience server 102. In some implementations, with appropriate credentials, a virtual experience application developer may obtain access to virtual experience application objects, such as in-platform currency (e.g., virtual currency), avatars, special powers, accessories, that are owned by or associated with other users.

In general, functions described in one implementation as being performed by the online virtual experience server 102 can also be performed by the user device(s) 110, or a server, in other implementations if appropriate. In addition, the functionality attributed to a particular component can be performed by different or multiple components operating together. The online virtual experience server 102 can also be accessed as a service provided to other systems or devices through appropriate application programming interfaces (APIs), and thus is not limited to use in websites.

In some implementations, online virtual experience server 102 may include a graphics engine 108. In some implementations, the graphics engine 108 may be a system, application, or module that permits the online virtual experience server 102 to provide graphics and animation capability. In some implementations, the graphics engine 108, and/or content management server 140 may perform one or more of the operations described below in connection with the flow charts shown in FIGS. 6B and 8.

Figure 2:
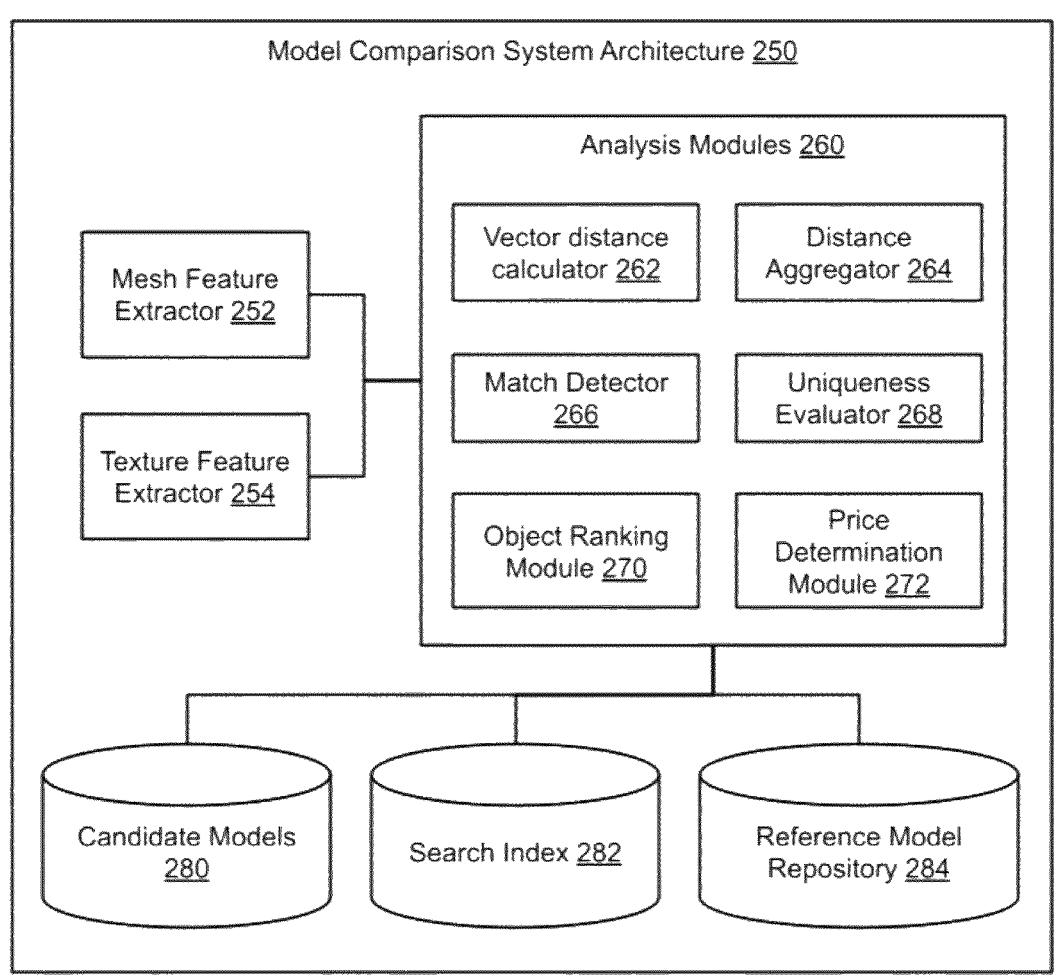
FIG. 2 illustrates an example of a system architecture to perform similarity detection of three-dimensional (3D) object models, in accordance with some implementations.

FIG. 2 illustrates an example of a system architecture to perform similarity detection of three-dimensional (3D) object models, in accordance with some implementations.

Model comparison system 250 includes mesh feature extractor 252, texture feature extractor 254, analysis modules 260, candidate models storage 280, search index storage 282, and reference models repository 284. Analysis modules 260 include vector distance calculator 262, distance aggregator 264, match detector 266, uniqueness evaluator 268, object ranking module 270, and price determination module 272.

The mesh feature extractor 252 is utilized to generate vector representations (embeddings) of the mesh of 3D objects, e.g., feature vectors that are based on the meshes of 3D objects. In some implementations, the mesh feature extractor may be configured to determine feature vectors (embeddings) that may be based on a machine learning model, e.g., a trained neural network that is pre-trained as a classifier.

The texture feature extractor 254 is utilized to generate vector representations of textures associated with the models of 3D objects, e.g., feature vectors that are based on textures of 3D objects.

Analysis modules 260 may be utilized to perform various operations on the generated feature vectors. Vector distance calculator 262 is utilized to calculate a respective distance, e.g., a Euclidean distance (L2 norm or L2 distance), cosine similarity, etc., between two feature vectors. Distance aggregator 264 may be utilized to apply one or more techniques to combine distances determined based on comparisons of mesh feature vectors and texture feature vectors, respectively.

Match detector 266 may be utilized to apply suitable predetermined threshold(s) to compare 3D objects based on a distance between their feature vectors. The comparison may be utilized to determine a relationship between models of 3D objects, e.g., similarity, duplication, etc.

Uniqueness evaluator 268 determines a measure of uniqueness of a 3D object based on a distance between model feature vector of a 3D object and a model feature vector of other 3D objects, e.g., between a mesh feature vector of a 3D object and mesh feature vectors of neighboring 3D objects.

Object ranking module 270 may be utilized to rank 3D objects based on their relative distance (e.g., a distance between respective mesh feature vectors) from one another and may be utilized to retrieve lists of 3D objects based on criteria, e.g., retrieve a particular number of similar objects, retrieve identical 3D objects, retrieve a particular number of unique 3D objects, etc.

Price predictor 272 may be utilized to determine a suggested price for a 3D object based on particular attributes of the models of 3D objects, e.g., similarity to other 3D object models, uniqueness of the model, etc.

Candidate models storage 280 may be utilized to store models of candidate 3D object models that may be received at the platform (e.g., from developer users that may create the object using on-platform or off-platform tools) for storage prior to their classification (and/or use on the platform). The candidate 3D object models may be received from users, e.g., developer users for use on the platform. The 3D object models may be made available for free or for purchase on the platform by users, e.g., developer users and content creators on the platform.

The search index 282 is an index of feature vectors of 3D object models, e.g., of meshes and/or textures, to enable efficient and timely search of mesh feature vectors and texture feature vectors of 3D object models.

The reference model storage (repository) 284 may store authentic 3D object models and/or previously classified 3D object models utilized across the platform. The storage may support scenarios where a particular 3D object model is utilized in a single virtual experience hosted on the virtual experience platform as well as where a particular asset model (e.g., 3D object) is utilized in multiple virtual experiences across the virtual experience platform. In some implementations, embeddings (feature vectors) of selected 3D object models may also be stored in reference model storage 284.

When a new object is added, corresponding mesh and texture feature vectors may be calculated by mesh feature extractor 252 and texture feature extractor 254. If the object is determined to be authentic (e.g., based on results from distance aggregator 264 and match detector 266 (and optionally, uniqueness evaluator 268), the object (mesh and texture) may be stored in reference model storage 280. The mesh and texture vectors calculated for the object may be stored in search index 282 in association with an object identifier (e.g., that identifies the object in reference model storage 280).

Figure 3:
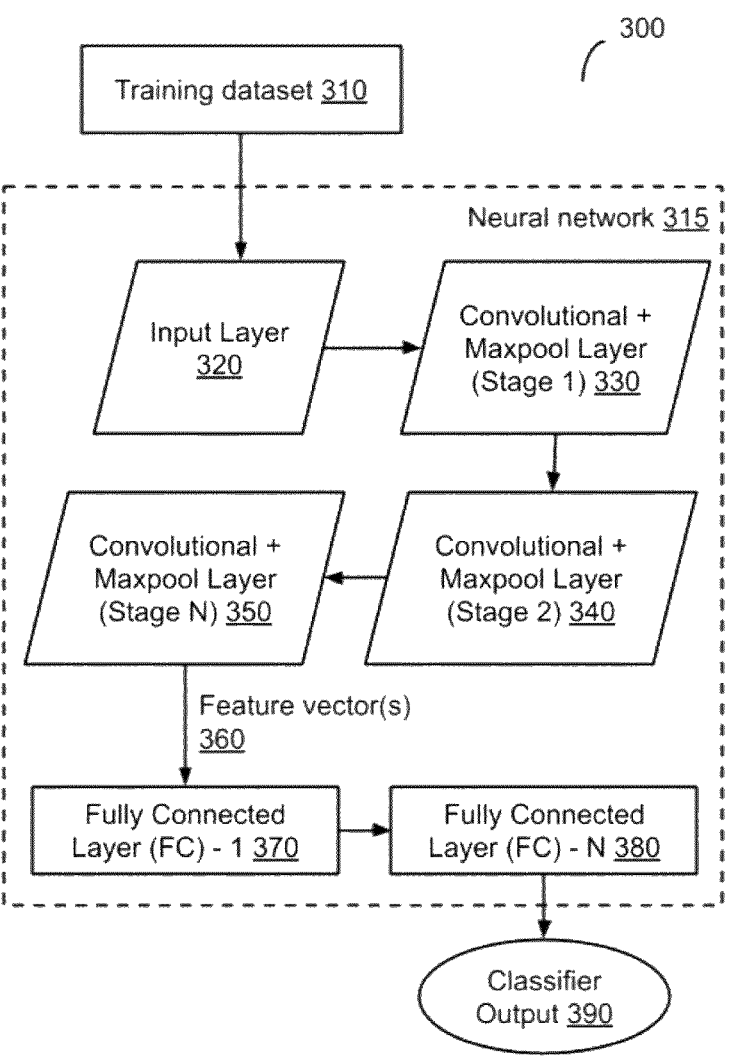
FIG. 3 is a schematic that depicts an example deep neural network based classifier that includes convolution and pooling layers, in accordance with some implementations.

FIG. 3 is a schematic that depicts an example deep neural network based classifier 300 that includes convolution and pooling layers, in accordance with some implementations.

In some implementations, a neural network architecture designed for processing and analyzing 3D meshes may be utilized. The neural network may be utilized to analyze the structure of the meshes to perform classification of meshes. In some implementations, the neural network model may be applied directly on the structure of 3D meshes. The input to the neural network is the mesh itself, including all vertices and edges.

In some implementations, edge convolutions are included in the neural network. This can be significant since edges within a mesh include important geometric information such as lengths and angles that define the shape of the mesh. By focusing on edges, intrinsic properties of the mesh can be captured more effectively by the neural network.

In some implementations, mesh-specific pooling and un-pooling operations are utilized to reduce the spatial dimensions of the mesh. The pooling and un-pooling operations are applied to simplify the mesh by reducing a total number of edges while preserving the overall structure, thereby enabling the hierarchical features to be learnt by the network.

In some implementations, a hierarchy of features in the mesh is analyzed by progressively simplifying the mesh through pooling layers. This hierarchical representation enables learning by the neural network of complex patterns and relationships within the mesh at different levels of detail.

As depicted in FIG. 3, a neural network 315 includes an input layer 320, a plurality of stages of convolutional+ maxpool layers, arranged sequentially, e.g., stage 1 330, stage 2 340, and stage N 350. In various implementations, the number of stages N can be 3, 4, 5, or any number of stages. Neural network 315 further includes one or more fully connected (FC) layers, e.g., FC 1 370 and FC N 380 (where N can be 0, 1, 2, 3, or more), arranged sequentially. In various implementations, any number of FC layers can be utilized.

Neural network 315 can be trained using a training dataset that includes a plurality of meshes. 3D mesh data is obtained and normalized to a standard scale and orientation. The neural network includes a plurality of layers arranged in sequence. Individual meshes from the training dataset 310 (after normalization) are provided to an input layer 320. Edge features (e.g., edge lengths, edge angles) are determined and analyzed by the input layers. Stages 330-350 may be utilized to process the output of the immediately previous stage. The maxpool layers are utilized to manage the hierarchical structure of the mesh. The convolution layers operate on the edges of the mesh. In different implementations, different numbers of convolutional and maxpool layers may be deployed. The output of stage N 350 is a feature vector 360 (also referred to as embedding) for each input mesh. Each feature vector is a representation of the input mesh in a vector space.

The output feature vector 360 is provided to the first FC layer 370 of the one or more FC layers. In this illustrative example, Fully Connected Layer-1 370 and Fully Connected Layer-N 380 are shown. The output of the FC layers is the classifier output 390. In some implementations, the first FC (370) layer is utilized to adapt the dimensionality of the embedding that is to be utilized to compute the embedding distance. The last FC (380) is determined by a number of classes of the classifier. The classes may be selected from a variety of objects, e.g., trees, cars, shoes, heads, chairs, elephants, tv, sofa, glass, fork, etc.

A suitable loss function (e.g., a cross-entropy loss function) for classification is defined. In some implementations, the cross-entropy is used for classification during training and is based on a difference between the labels and the predictions. During training, 3D mesh data is provided to the neural network, the loss computed, and the neural network weights (e.g., of nodes in any of layers 320-340 and/or 370-380) are updated using backpropagation using the loss function.

In some implementations, data augmentation techniques specific to 3D meshes may be applied to improve the robustness of the neural network model. The trained neural network model is usually tested on a separate validation or test dataset meshes to evaluate its performance, and deployed upon successful validation.

Figure 4:
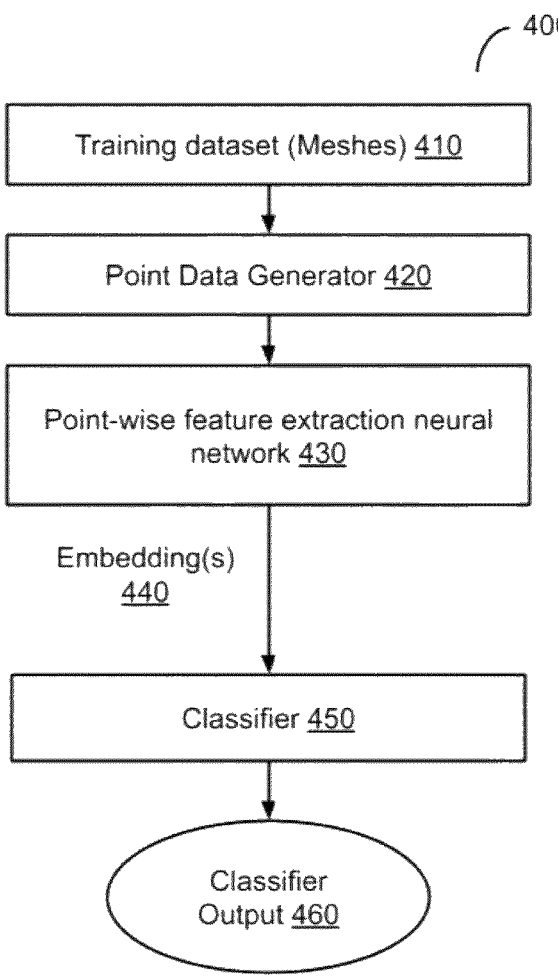
FIG. 4 depicts an example point cloud based classifier that includes convolution, normalization, and pooling layers, in accordance with some implementations.

FIG. 4 depicts an example point cloud based classifier 400 that includes convolution, normalization, and pooling layers, in accordance with some implementations.

The point cloud based classifier utilizes a neural network architecture that is designed to directly process and analyze point cloud data that is generated from the mesh data, e.g., the vertices of the mesh of a 3D object.

In some implementations, the point cloud based classifier directly operates on the raw point cloud data. Symmetric functions (e.g., max pooling) may be utilized to ensure that operations of the classifier are invariant to the ordering of points in the point cloud. The property of invariance is important because the order of points in a point cloud is arbitrary.

Pointwise features and global features are learned by the classifier from the point cloud. Local features are extracted from individual points and aggregated to form a global representation of the entire point cloud. In some implementations, additional hierarchical structures may be included in the classifier that is utilized to capture local and global context at multiple scales, thereby enhancing the ability of the classifier to handle complex geometric structures. In some implementations, a max pool operation is utilized for the aggregation of features from local features to global features within a mesh.

In this illustrative example, training datasets 410 that includes meshes are provided to point generator 420 to generate point clouds. In some implementations, a number of points in a point cloud may correspond to a number of points (vertices) in the mesh. In some other implementations, points may be sampled on the surface of an input mesh. In such a scenario, a number of points in a point cloud may be different from the number of vertices in the mesh. In some implementations, the point cloud may be normalized to a standard scale and orientation prior to being provided to point generator 420. Additionally, downsampling may be performed to sample a fixed number of points from each point cloud.

Subsequent to any preprocessing that is performed, the point clouds are provided to a neural network 430 that performs feature extraction and generates embeddings 440. Each of the embeddings represents a corresponding input mesh in vector space.

The neural network architecture may include one or more input and feature transformation networks. One or more point-wise feature extraction layers can be included. A symmetric function (e.g., max pooling) layer can be included to aggregate global features. Inputs to the function may include class labels based on the ground truth and the class labels predicted by the model. The neural network model is constructed by stacking one or more of the aforementioned layers together. A suitable loss function, e.g., a cross-entropy loss function is defined.

The neural network may include feature extraction layers/transformation networks 430 followed by one or more classifier layers 450. Based on the embeddings, a classifier layer 450 generates classifier output 460.

During a training phase, point cloud data generated from training meshes are provided to the neural network, a loss is computed based on the defined loss function, and weights of the neural network under training are updated by using backpropagation. Data augmentation techniques specific to point clouds can be applied to improve the robustness of the model.

In some implementations, data augmentation techniques for point clouds and meshes include performing random rotations of the points (vertices) in the mesh and performing random scaling in the coordinate dimensions (x,y,z directions) prior to being provided to the neural network under training.

In some implementations, during training using point clouds, points within the point cloud (or a local neighborhood of points within the point cloud) may be randomly deleted during training of a neural network. In some implementations, during training using meshes, holes may be created in the mesh by deleting a local neighborhood of vertices and faces. Additionally, in some implementations, the mesh may be decimated or subdivided prior to being provided to the neural network under training.

The trained classifier may be validated based on a separate validation dataset or test data set to evaluate its performance (e.g., precision and/or recall of mesh classification), and deployed when the model performance meets a predetermined threshold.

Figure 5A:
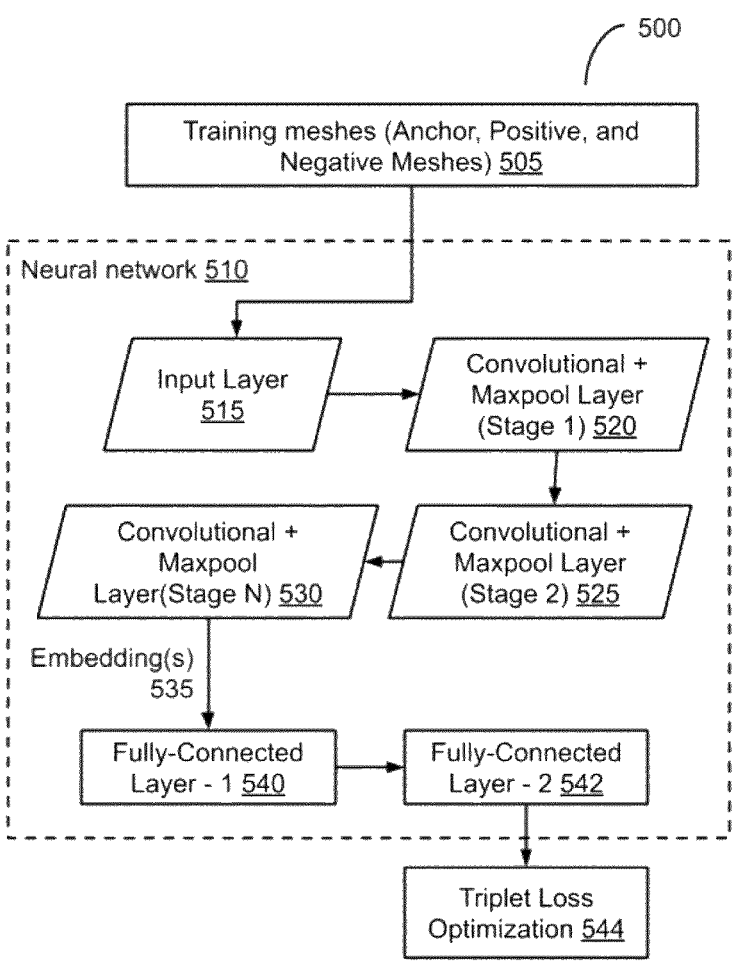
FIG. 5A illustrates an example neural network with triplet loss function based optimization, in accordance with some implementations.

FIG. 5A illustrates an example neural network with triplet loss function based optimization, in accordance with some implementations.

To train the network, the input data (e.g., meshes) are mapped into a high-dimensional embedding space using the neural network. The task for the neural network is to generate mesh embedding such that, in the embedding space, similar inputs (e.g., meshes of similar 3D objects) are close to each other and dissimilar inputs (e.g., meshes of dissimilar 3D objects) are far apart. Triplets that include anchor meshes, positive matches (meshes that match the anchor meshes), and negative matches (meshes that do not match the anchor meshes) are provided to the neural network during a training phase. Groundtruth associations (anchor-match-mismatch), e.g., provided as manually curated labels (or labels generated using automated techniques) are used to calculate a triplet loss.

In a triplet loss function based neural network, a triplet loss function is used to train the neural network model to produce embeddings that are closer to the anchor mesh for the positive mesh case than for the negative mesh case. Use of a triplet loss during training ensures that the distance (in embedding space) between an anchor and a positive sample (same class) is less than the distance between the anchor and a negative sample (different class) by at least a threshold margin.

By ensuring that the embeddings of similar items are closer together than those of dissimilar items, the network is trained for tasks that involve comparing and identifying similar meshes.

FIG. 5A depicts an example neural network 510 under training. The neural network 510 includes an input layer 515, two or more stages of convolutional+MaxPool layers, e.g., stage 1 520, stage 2 525, up to stage N 530 (where N is the total number of stages), and two fully-connected layers (FC layers) 540 and 542. In different implementations, different numbers of convolutional and maxpool layers may be deployed.

As depicted in FIG. 5A, triplets of training meshes 505 are provided to the input layer 515 of the neural network 510.

Each of the three inputs (anchor, positive, negative) are processed by the neural network and mapped to an embedding space. Embeddings 535 are generated by passing each element of the triplet through the neural network. The embeddings are provided to one or more fully connected (FC) layers. During a training phase, the output of the FC layers is provided to a triplet loss based optimization module 544.

A triplet loss is computed for each triplet. The gradients of the triplet loss with respect to the network parameters are computed. Network weights of input layer 515 and/or one or more of stages 520-530 of neural network 510 are updated using backpropagation to minimize the triplet loss. The triplet loss function is selected to minimize the distance between the anchor and the positive, while maximizing the distance between the anchor and the negative. Training may be performed using any number of training meshes (e.g., 1000 meshes, 5000 meshes, etc.). Training may be performed in epochs, with a number of triplets being used in each epoch (e.g., 100 triplets per epoch). In some implementations, triplets may be constructed by randomly using a negative mesh in combination with an anchor-positive mesh pair. Any number of training epochs may be used, e.g., until triplet loss calculated in a final epoch (or M final epochs) meets a threshold; until incremental change in the triplet loss between consecutive epochs falls below a threshold; until the training dataset is exhausted; until a computational budget for training is exhausted; until change in neural network weights between consecutive epochs falls below a threshold; etc.

The training process trains the network to generate embeddings for input meshes such that similar meshes are closer together and dissimilar inputs are farther apart in embedding space. By training on triplet loss, the neural network learns robust and discriminative features of meshes of 3D objects and is effective at generating embeddings that can be utilized for similarity measurements.

In some implementations, margin enforcement may be performed to prevent trivial solutions where the distances are zero. When margin enforcement is performed, a minimum separation is enforced between positive and negative pairs in the embedding space.

Figure 5B:
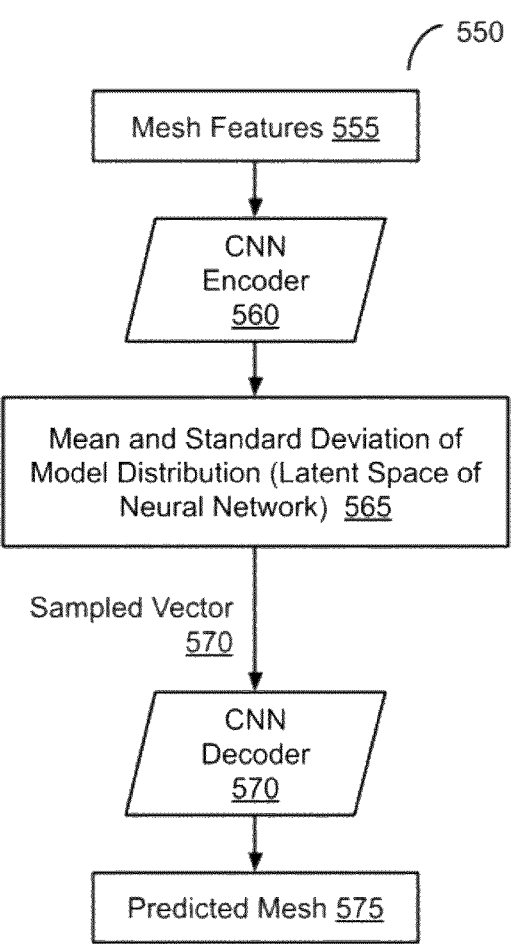
FIG. 5B illustrates an example variational encoder based neural network, in accordance with some implementations.

FIG. 5B illustrates an example variational encoder based neural network, in accordance with some implementations.

A variational encoder (autoencoder) is a type of generative model that uses neural networks to learn a probabilistic mapping from a high-dimensional input space to a lower-dimensional latent space and vice versa. The variational encoder includes an encoder and a decoder.

The encoder is utilized to encode input data (e.g., meshes, textures, etc.) and map the data to a lower-dimensional latent space. However, instead of mapping each input to a single point in the latent space, the input is mapped to a distribution, e.g., a Gaussian distribution.

The decoder is then utilized to sample points from this latent space distribution and map them back to the high-dimensional input space, effectively reconstructing the input data or generating new data.

Parameters of the encoding and decoding functions are learnt such that the input data can be accurately reconstructed from the latent space, while also ensuring that the latent space distributions are close to a predefined prior distribution, e.g., a standard normal distribution.

As depicted in FIG. 5B, mesh features 555 are provided to CNN encoder 560. The CNN Encoder network 560 provides as output the parameters of a distribution over a latent space of the neural network model. In some implementations, the distribution may be a Gaussian distribution characterized by a mean and a standard deviation.

During a decoding stage (generative stage), a sampled vector 568 is obtained from the distribution and provided to CNN decoder 570. The CNN decoder operates on the sampled vector and outputs the parameters of the distribution over the data space. For example, the decoder may provide as output predicted mesh 575 that is representative of the mean values for the reconstructed mesh (by the decoder).

During a training phase, a reconstruction loss is utilized to measure how well the decoder is able to reconstruct the input data from the latent representation. Gradients are computed based on the reconstruction loss and network weights are updated using backpropagation to minimize the reconstruction loss over the training datasets.

Subsequent to training, a feature vector (embedding) may be obtained for an input mesh by applying the variational encoder based neural network to the input mesh.

Figure 6A:
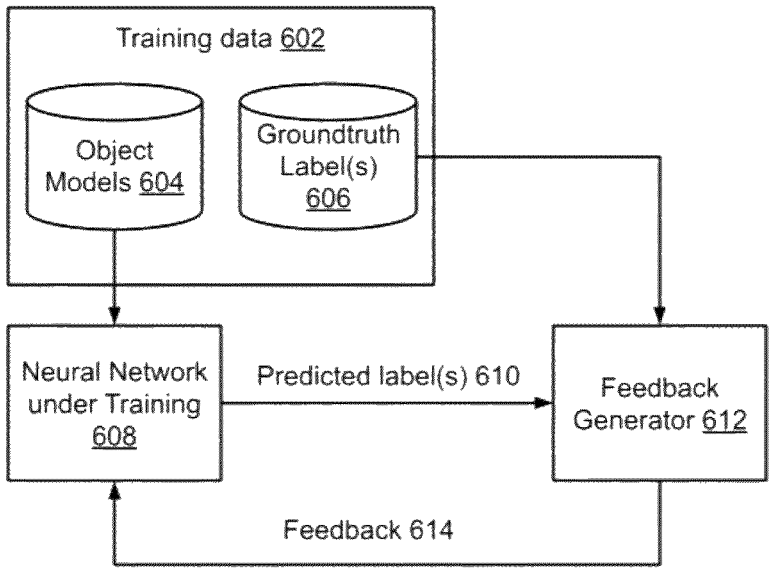
FIG. 6A is a schematic that depicts training of a neural network based classifier, in accordance with some implementations.

FIG. 6A is a schematic that depicts training of a neural network based classifier, in accordance with some implementations.

The training can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, a neural network 608 is trained based on training data 602 and a feedback generator 612.

The training data 602 includes a plurality of 3D object models 604 and associated groundtruth labels 606. The 3D object models may include models of 3D objects both from within an online platform (e.g., previously submitted and labeled 3D object models (and from outside the platform, e.g., publicly available models of 3D objects. The groundtruth labels may be obtained from tags provided by the developers of the models and/or from other automated tag generators. In some implementations, the groundtruth labels may be generated based on manual review of the 3D object models.

In this illustrative example, object models 604 are provided to a neural network under training 608. The neural network generates predicted labels 610 based on a current state of the neural network (parameters, including weights) and the 3D object models. The predicted labels 610 are provided to feedback generator 612.

Feedback generator 612 is also provided with the groundtruth labels 606 corresponding to each object model utilized in training. Feedback 614 is generated by feedback generator 612 based on a comparison of the predicted labels with the groundtruth labels. The feedback 614 is utilized to update the weights of the neural network 608 under training. Neural network 608 may be implemented as any of the neural networks described with reference to FIGS. 3, 4, and 5A-B. Training may be performed in epochs, with each epoch using a subject of the models and groundtruth labels for training neural network 608. In each epoch, weights of the neural network are adjusted based on the feedback 614 in a manner that increases a likelihood that a predicted label 610 matches a corresponding groundtruth label 606 for individual 3D objects.

Figure 6B:
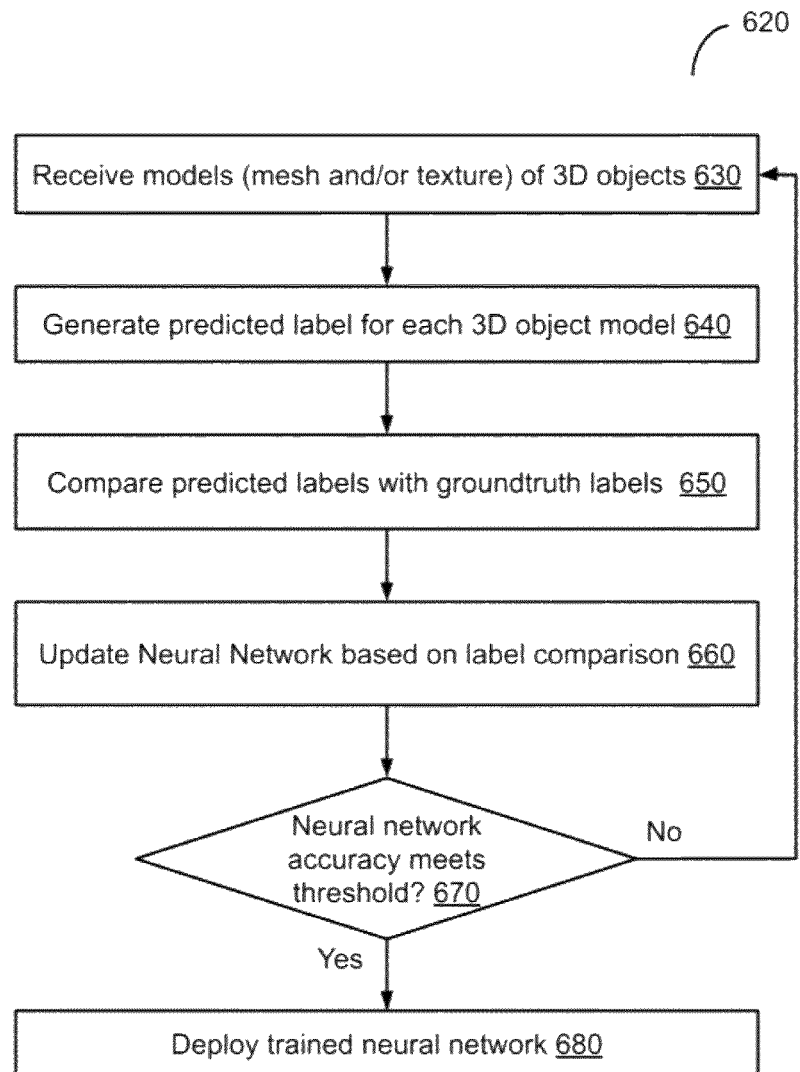
FIG. 6B illustrates an example method to train a neural network based classifier, in accordance with some implementations.

The training of the neural network may be performed periodically at specified intervals, or be triggered by events. In some implementations, the training may be performed until a threshold level of label prediction accuracy is reached, all of the training data is utilized, a computational budget for training is exhausted, an improvement in label prediction accuracy between consecutive training epochs falls below a threshold, or other criteria, FIG. 6B illustrates an example method to train a neural network based classifier, in accordance with some implementations.

In some implementations, method 620 can be implemented, for example, on gaming server 102 described with reference to FIG. 1. In some implementations, some or all of the method 620 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 620. In some examples, a first device is described as performing blocks of method 620. Some implementations can have one or more blocks of method 620 performed by one or more other devices (e.g., other client devices or server devices) that can send results or data to the first device.

In some implementations, the method 620, or portions of the method, can be initiated automatically by a system. In some implementations, the implementing system is a first device. For example, the method (or portions thereof) can be periodically performed, or performed based on one or more particular events or conditions, e.g., an accuracy of the classifier falling below a threshold, a predetermined time period having expired since the last performance of method 620, and/or one or more other conditions occurring which can be specified in settings read by the method.

In some implementations, the neural network based classifier is a mesh classifier, and training of the neural network based classifier includes training the mesh classifier. In some implementations, the neural network based classifier is a texture classifier, and training of the neural network based classifier includes training the texture classifier.

In some implementations, the texture classifier and mesh classifier are trained separately on different sets of 3D object models. In some other implementations, the texture classifier and mesh classifier are trained together on a set of 3D object models, e.g., where some 3D object models include a mesh and a texture and others might include only mesh or texture. In some implementations, the architecture might consist of two separate inputs and subnetworks which are fused and concatenated together on the final blocks of the network.

In some implementations, the texture classifier may be trained on a set of non-texture images based on a classification task. In some implementations, the classifier may first be pre-trained on normal images and then fine-tuned based on textures.

Method 620 may begin at block 630. At block 630, 3D object model data are provided as input to a neural network. The 3D object model data may include a plurality of meshes and textures, and corresponding labels for each mesh and/or texture. Block 630 may be followed by block 640.

At block 640, predicted text labels are generated by the neural network based on the 3D object model.

In some implementations, training data that includes a plurality of reference meshes of 3D objects and a respective set of labels of different classes associated with each 3D object is provided as input to the neural network classifier.

In implementations using a neural network, a respective feature vector may be generated for each object model based on the model attributes, e.g., vertices and edges of the model. In some implementations, the neural network includes one or more input neural networks and an output neural network. The respective feature vector(s) are generated using the one or more input neural networks and the respective feature vector(s) may be provided as inputs to the output neural network that generates a label for each 3D object model.

In some implementations, a first type of neural network generates a feature vector based on the mesh attributes and a second type of neural network generates a feature vector based on the texture attributes of the 3D object model.

Block 640 may be followed by block 650.

At block 650, the predicted labels are compared to groundtruth labels. For example, one or more labels for the 3D object model is compared to respective groundtruth labels associated with the 3D object model. An accuracy of label prediction is determined for each 3D object model, e.g., it is evaluated whether the neural network successfully predicted labels for each 3D object model. A loss value is determined based on the accuracy of label predictions.

In some implementations, a single class per object may be utilized during training, In some other implementations, multiple labels per object may be utilized during training. A binary cross-entropy function may be utilized for each of the classes when multiple labels per object are utilized. Block 650 may be followed by block 660.

At block 660, the neural network (e.g., weights associated with one or more nodes of the neural network is updated based on feedback generated from the comparison of the predicted labels and the groundtruth labels. For example, the loss value is utilized to adjust one or more parameters of the neural network. The weight associated with one or more nodes of the neural network and/or a connection between one or more pairs of nodes of the neural network may be adjusted based on the loss value. Block 660 may be followed by block 670.

At block 670, an accuracy of the neural network is determined based on cumulative results, and compared to a threshold. If the accuracy meets a threshold, the trained neural network is determined to be suitable for deployment and processing proceeds to block 670, else, the training is continued and processing reverts to 630.

In some implementations, the training may be performed in epochs, with each epoch using a subject of the models and groundtruth labels for training the neural network. In each epoch, weights of the neural network are adjusted based on feedback such that a likelihood increases that a predicted label matches a corresponding groundtruth label for individual 3D objects.

At block 670, the trained neural network may be deployed to provide classification labels for an input 3D object model (mesh and/or texture).

Method 620, or portions thereof, may be repeated any number of times using additional inputs. For example, blocks 640 and 650 may be repeated with multiple sets of groundtruth labels. Method 620 may be repeated until a threshold level of classification accuracy is reached.

In some implementations, method 620 may be repeated when additional training data (e.g., new models uploaded by users) is received. In some implementations, method 620 may be repeated when it is determined that the trained neural network has a failure rate that meets a predetermined failure rate threshold. In such a scenario, additional training data may be obtained, and the neural network may be retrained to improve accuracy.

Figure 7:
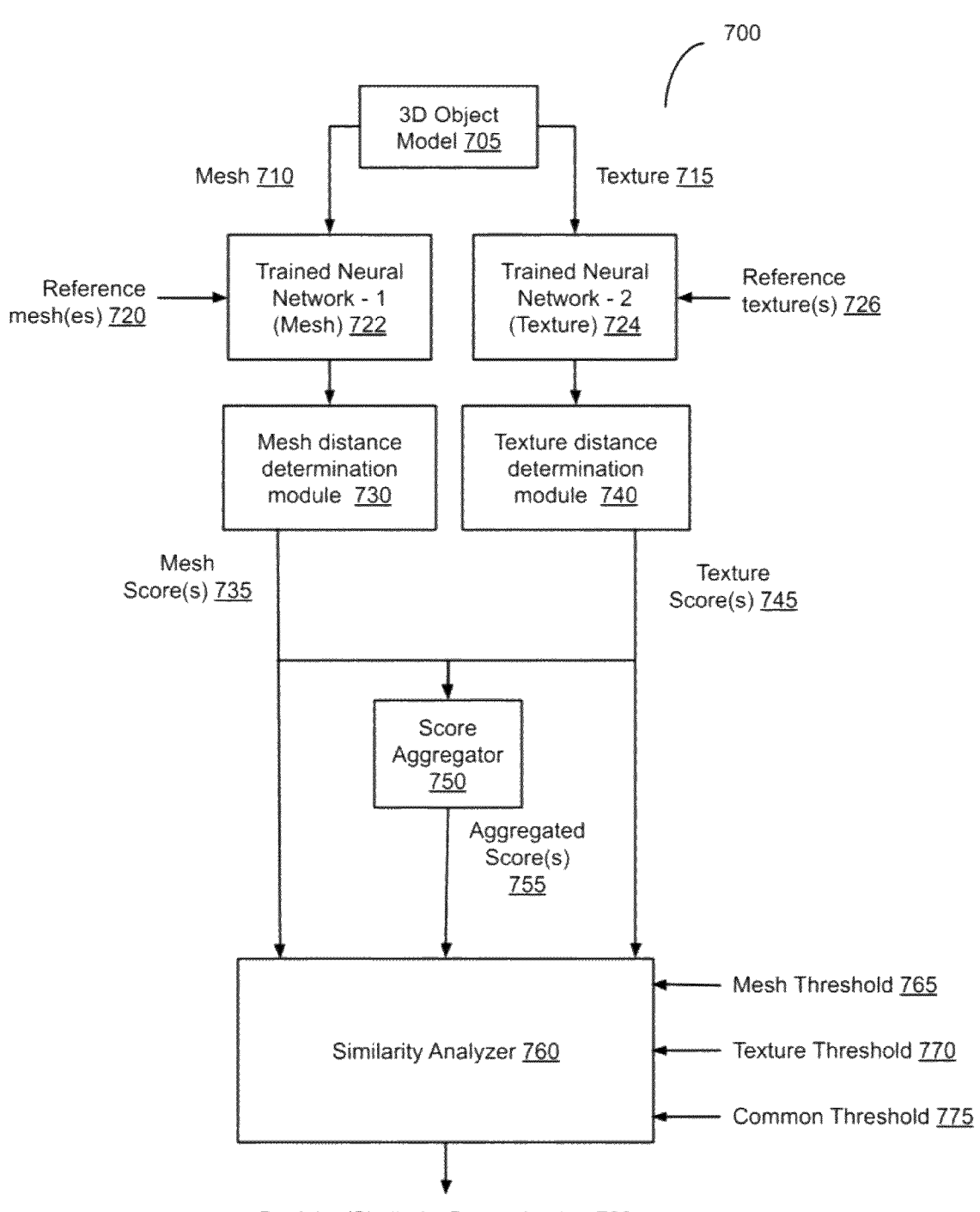
FIG. 7 is a schematic that depicts aggregation of similarity scores based on mesh distance determination and texture distance determination, in accordance with some implementations.

FIG. 7 is a schematic that depicts aggregation of similarity scores based on mesh distance determination and texture distance determination, in accordance with some implementations.

As depicted in FIG. 7, similarity analysis 700 is performed based on a 3D object model 705. In some cases, the 3D object may include a mesh 710 and an associated texture 715. In some cases, only a mesh 710 may be included, and in some other cases, only a texture 715 may be included.

A 3D object model may be compared to one or more reference mesh(es) 720 and one or more reference texture(s) 726. A first trained neural network 722 (Trained Neural Network-1) may be utilized to compare meshes while a second trained neural network 724 (Trained Neural Network-2) may be utilized to compare textures. As described earlier, the trained neural networks may be trained as classifiers based on training datasets that include meshes and/or textures.

In some cases, a 3D object model may be compared to a single reference object model to determine a similarity of the 3D object models, while in some cases, a 3D object model may be compared to multiple 3D object models, e.g., pairwise comparison between the 3D object model and one or more of the multiple 3D object models.

Trained neural network-1 722 may operate on a received 3D object mesh to determine an embedding (mesh feature vector) that is representative of the received 3D object mesh. As described earlier, while the trained neural network-1 722 is trained as a mesh classifier, during the generation of the embedding, a classification of the received mesh is not performed, and only the embedding obtained from the mesh classifier is utilized.

Trained neural network-1 722 is also utilized to generate reference embedding(s) based on reference mesh(es) 720. In some implementations, the reference embedding(s) may be previously determined and stored, whereas in some other implementations, the reference mesh embedding(s) may be determined at time of performing a similarity analysis.

Trained neural network-1 724 may operate on a received 3D object texture to determine an embedding (texture feature vector) that is representative of the received 3D object texture. As described earlier, while the trained neural network-2 724 is trained as a texture classifier, during the generation of the embedding, a classification of the received texture is not performed, and only the embedding obtained from the texture classifier is utilized.

A mesh distance determination module 730 is utilized to determine a mesh score 735 (vector distance) between the mesh embedding that corresponds to the received 3D object mesh and a reference mesh embedding that corresponds to the reference 3D object mesh.

A texture distance determination module 740 is utilized to determine a texture score 745 (vector distance) between the texture embedding that corresponds to the received 3D object texture and a reference texture embedding that corresponds to the reference 3D object texture.

The mesh score(s) 735 and texture score(s) 745 for a received 3D object model is combined (fused) by score aggregator 750 to determine aggregated score(s) 755.

In some implementations, the aggregate score 755 is determined by applying an aggregation function to the mesh score and texture score. In some implementations, the aggregated score may be a weighted sum or a generalization of a weighted sum. For example, the aggregated score may be determined by the equation:

$$P_s(\mu_1, \mu_2; \omega_1, \omega_2) = \left( \frac{\omega_1 \mu_1^s + \omega_2 \mu_2^s}{\omega_1 + \omega_2} \right)^{\frac{1}{s}}$$

where $\mu_1$ and $\mu_2$ are individual preferences (weights) for the mesh distance ($\omega_1$) and texture distance ($\omega_2$), respectively. The parameter "s" is based on a degree of compensation for the model type being compared, e.g., the trade-off strategy to be adopted for weighing the respective similarities, e.g., mesh similarity versus texture similarity. Higher values of s indicate that higher values of one distance metric may be applied to compensate for lower preferences for another distance metric. Assigning s=1 provides for a weighted sum.

The aggregated score(s) 755, along with mesh score(s) 735 and texture score(s) 745 are provided to similarity analyzer 760. Configurable thresholds that include a mesh threshold 765, a texture threshold 770, and a common threshold 775 are utilized in conjunction with the mesh score(s) 735, texture score(s), and/or aggregated score(s) 755 to determine similarity of the received 3D object model with one or more reference models. A decision or similarity determination 780 may be generated by similarity analyzer 760.

Multiple modes of similarity analysis and/or duplicate detection of 3D object models can be supported by utilizing the architecture disclosed herein.

In a first mode, the similarity analysis and/or a decision (determination) whether a 3D object model is a duplicate or not is based only on the mesh distance score. This first mode can be used if detection of duplicate textures is not of interest or if the model includes a mesh that is not associated with a texture, e.g., a 3D object model that only includes a mesh (and no texture). This first mode can enable detection of duplicate meshes. Mesh threshold 765 can be utilized, e.g., a received mesh is considered to be duplicate if the mesh distance score meets the predetermined mesh threshold. In this first mode, trained neural network-2 724, texture distance determination module 740, and score aggregator 750 may not be utilized in performing similarity analysis of the 3D object models. For example, in the first mode, block 705 may be followed by block 722, block 730, block 760, and block 780, respectively.

In a second mode, the similarity analysis and/or a decision (determination) whether a 3D object model is a duplicate or not is based only on the texture distance score. This second mode can be used if detection of duplicate meshes is not of interest or if the model is not associated with a mesh, e.g., a 3D object model that only includes a texture (and no mesh). This second model can enable detection of duplicate textures. Texture threshold 770 can be utilized, e.g., a received texture is considered to be duplicate if the texture distance score meets the predetermined texture threshold. In this second mode, trained neural network-1 722, mesh distance determination module 730, and score aggregator 750 may not be utilized in performing similarity analysis of the 3D object models. For example, in the second mode, block 705 may be followed by block 724, block 740, block 760, and block 780, respectively.

In a third mode, the similarity analysis and/or a decision (determination) whether a 3D object model is a duplicate or not is based on the aggregated score. In some implementations, a third neural network may be utilized to combine the mesh score and the texture score into an aggregated score.

In some implementations, it is determined that two models under comparison are similar (e.g., duplicates) if any of the three thresholds are met, e.g., exceeded. In some other implementations, it is determined that two models under comparison are similar (e.g., duplicates) if two or more of the three thresholds are met.

Figure 8:
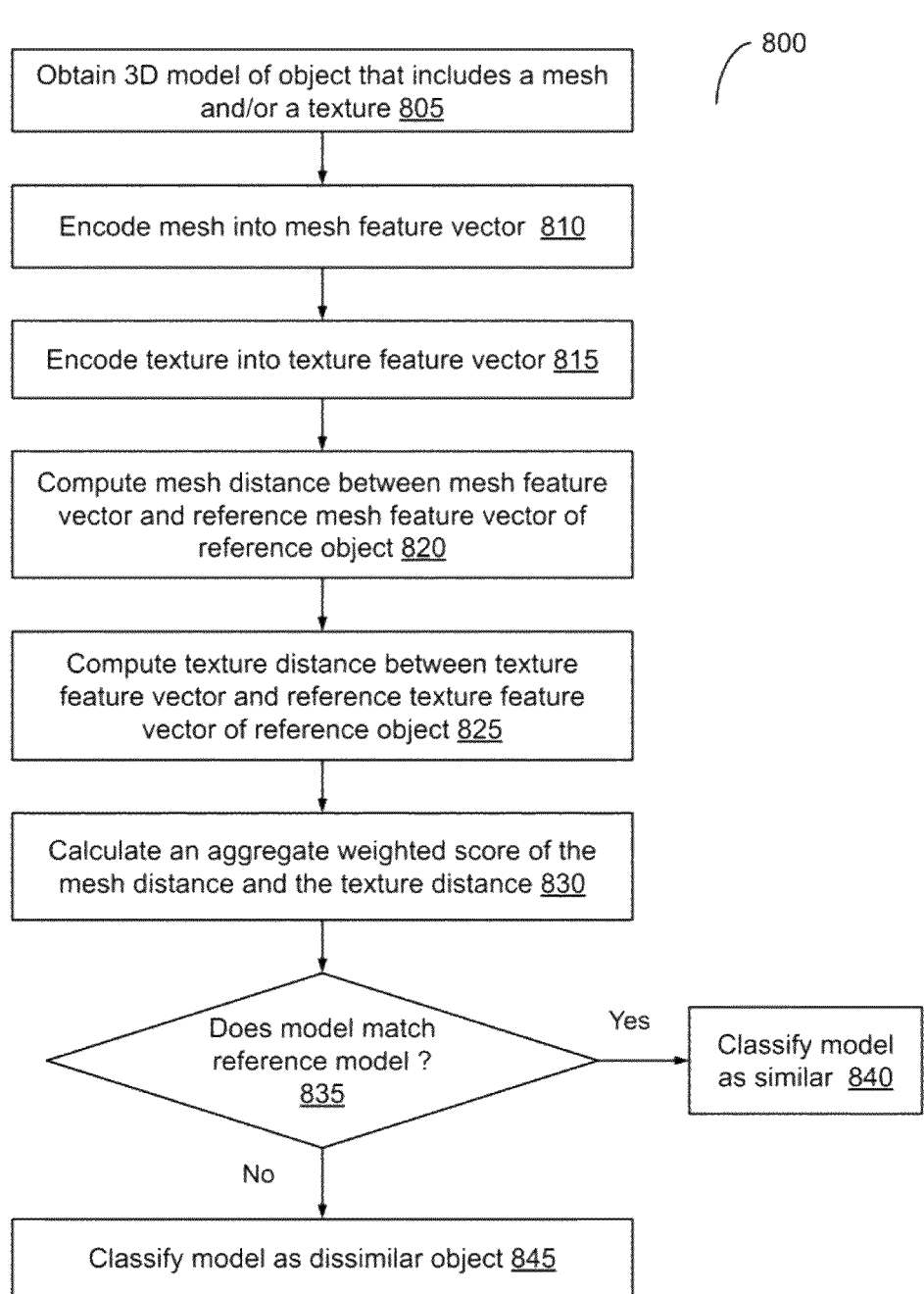
FIG. 8 illustrates an example method to perform similarity detection of three-dimensional (3D) object models, in accordance with some implementations.

FIG. 8 illustrates an example method to perform similarity detection of three-dimensional (3D) object models, in accordance with some implementations.

In some implementations, method 800 can be implemented to classify a candidate 3D object, for example, on virtual experience server 102 described with reference to FIG. 1. In some other implementations, method 800 can be implemented, for example, on one or more servers described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

Method 800 may begin at block 810. At block 805, a three-dimensional (3D) model of an object is obtained. In some implementations, the 3D model may include a mathematical description of the model that includes a mesh defined by a plurality of points. Each point may be associated with a respective 3D coordinate and/or a texture. During rendering of the object, the texture may be applied to the mesh to render the object for display, e.g., on a display screen. In some implementations a UV map may be utilized to map the texture to the mesh surface, since the mesh is a surface in 3D and the image is a 2D image (surface). The UV map is utilized to define the mapping from the pixel coordinates of the 3D image onto the 3D mesh surface.

Block 805 may be followed by block 810.

At block 810, the mesh is encoded into a mesh feature vector using a first neural network. In some implementations, encoding the mesh can include generating an embedding based on the received mesh. In some implementations, the mesh feature vector is agnostic to operations that do not alter a shape of the mesh. For example, the mesh feature vector (embedding) may be invariant to transformation operations on the mesh. For example, the mesh feature vector may be substantially agnostic (e.g., substantially invariant) to one or more operations of triangulation, resolution, rotation, translation, scale, subdivision, and/or decimation.

The encoding may be performed by applying one or more trained neural network based classifiers. For example, any of the neural networks described with reference to FIGS. 3, 4, 5A, and/or 5B may be applied to the mesh to generate an embedding of the mesh. In some implementations, the first neural network is a mesh classifier trained on a plurality of reference meshes of 3D objects. For example, the first neural network may be a previously trained neural network that is trained to perform mesh classification based on mesh features, e.g., all chairs are classified in one class, all tables in another class, all ducks classified in a third class, cars in a fourth class, etc.

As described earlier, while the neural networks may be trained as classifiers, during the process of generation of the embedding for the purposes of model comparison, a final stage of classification is not performed, and the generated embedding of the 3D object model (from the pre-final stage of the neural network) is utilized. For example, the embedding may be the output that is obtained from a pre-final layer of the neural network, where the final layer of the neural network is configured as the classifier output.

In some implementations, the first neural network includes an input layer, a plurality of convolution layers, and one or more fully-connected (FC) layers, wherein encoding the mesh includes providing the mesh as input at the input layer. In some implementations, the mesh feature vector is obtained as output of a final FC layer of the one or more FC layers.

In some implementations, providing the mesh as input at the input layer may include providing the 3D coordinates of the plurality of points to the input layer. In some implementations, a number of nodes of the input layer is equal to a number of the plurality of points.

In some implementations, where only textures are being compared, block 810 may be omitted, and block 805 may be followed by block 815. Block 810 may be followed by block 815.

At block 815, the received texture is encoded into a texture feature vector (embedding) using a second neural network that has been trained as an image classifier. In some implementations, where only meshes are being compared, block 815 may be omitted, and block 810 may be followed by block 820.

In some implementations, the second neural network may include a plurality of layers, and the texture feature vector may be obtained from a pre-final layer of the plurality of layers, where a final layer of the second neural network is configured to output a classification for the texture. Block 815 may be followed by block 820.

At block 820, a mesh distance between the mesh feature vector and a reference mesh feature vector of a reference object is computed. In some implementations, the mesh feature vector of the reference object may be determined previously and stored. Block 820 may be followed by block 825.

At block 825, a texture distance between the texture feature vector and a reference texture feature vector of the reference object is computed. Block 825 may be followed by block 830.

At block 830, an aggregate weighted score of the mesh distance and the texture distance is calculated. In some implementations, the aggregate weighted score may be determined by applying an aggregation function to the mesh distance (score) and the texture distance (score). In some implementations, the aggregated score may be a weighted sum or a generalization of a weighted sum. A degree of compensation for the model type being compared, 's' may be specified, e.g., the trade-off strategy to be adopted for weighing the respective similarities, e.g., mesh similarity versus texture similarity. Higher values of s indicate that higher values of one metric may be applied to compensate for lower preferences for the other metric. Assigning s=1 provides for a weighted sum. Block 830 may be followed by block 835.

At block 835, it is determined whether the model (object) matches the reference model (object). In some implementations, the determination may be made based on the aggregate weighted score of the mesh distance and the texture distance. If it is determined that the model matches the reference model, block 835 may be followed by block 840, else block 835 may be followed by block 845.

At block 840, the model may be classified as a similar object. In some implementations, subsequent to the classification of an object as a similar and/or inauthentic object, the object may be excluded from a listing in a virtual experience platform.

In some implementations, the 3D object model is received from a user account, and subsequent to classifying the object as a similar object, a message is transmitted to a device associated with the user account, providing information of similarity of the received object model to the reference object model. The received object model may be excluded from an object model repository.

In some implementations, the reference object model that is identified as being similar to the received object model may be displayed to the user. A user may then be enabled to make additional changes to the object model and submit a revised object model.

In some implementations, subsequent to the classification of an object as a similar and/or inauthentic object, a storage footprint of the object and the reference object may be compared and only one of the object model and the reference object model are stored on a storage device of a virtual experience platform based on their respective storage footprint, thereby optimizing storage requirements on the virtual experience platform. For example, if two models are compared and determined to be similar, only the model with a lower storage footprint is stored.

At block 845, the model may be classified as a dissimilar object.

In some implementations, the uniqueness of an object model may be determined based on the relative distance of the object model embedding from a set of reference embeddings. For example, respective distance(s) of the feature vectors of an object from multiple reference objects may be determined. The distances may be combined to determine a metric that is indicative of the uniqueness of the 3D object model. In some implementations, a suggested price for the 3D object model may be determined based on its uniqueness and provided to the user when a user submits a new 3D object model on the virtual experience platform. In some implementations, the suggested price may be based on the price of other proximate models. For example, the suggested price may be an average price of a particular number of nearest (as determined by the distance between respective embeddings) neighbor models.

Blocks 805-845 may be performed (or repeated) in a different order than described above and/or one or more steps can be omitted. For example, block 825 may be performed multiple times, e.g., to perform comparisons of the candidate 3D object models with multiple reference 3D object models. Block 820 may be omitted in implementations where the 3D model includes only a texture and/or in scenarios where only textures are being compared. Block 825 may be omitted in implementations where the 3D model includes only a mesh and/or in scenarios where only meshes are being compared.

Figure 9:
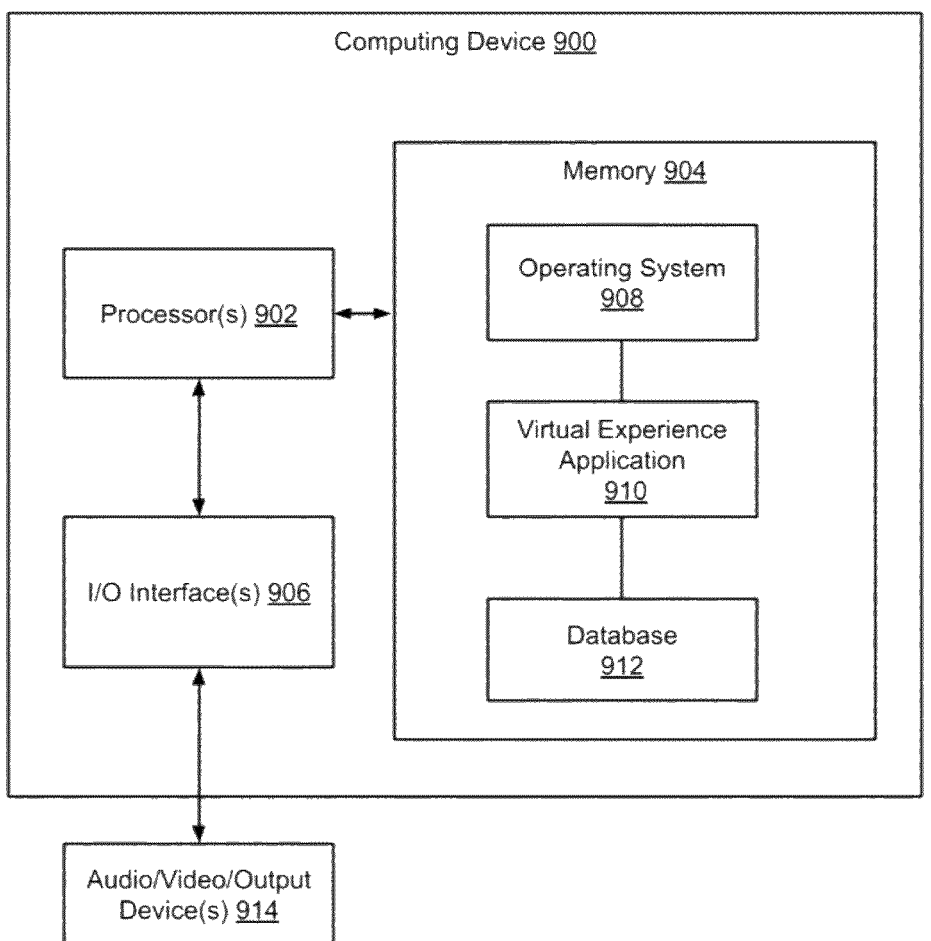
FIG. 9 illustrates an example computing device, in accordance with some implementations.

FIG. 9 illustrates an example computing device, in accordance with some implementations.

In one example, device 900 may be used to implement a computer device (e.g. 102, 110, and/or 130 of FIG. 1), and perform suitable method implementations described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 900 includes a processor 902, a memory 904, input/output (I/O) interface 906, and audio/video input/output devices 914.

Processor 902 can be one or more processors, processing devices, and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, one or more applications 910, e.g., an audio spatialization application, a sound application, content management application, and application data 912. In some implementations, application 910 can include instructions that enable processor 902 to perform the functions (or control the functions of) described herein, e.g., some or all of the methods described with respect to FIGS. 6B, and 8.

For example, applications 910 can include an audio spatialization module which as described herein can provide audio spatialization within an online virtual experience server (e.g., 102). Any software in memory 904 can alternatively be stored on any other suitable storage location or computer-readable medium. In addition, memory 904 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 108), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 914 can include a user input device (e.g., a mouse, etc.) that can be used to receive user input, a display device (e.g., screen, monitor, etc.) and/or a combined input and display device, that can be used to provide graphical and/or visual output.

For case of illustration, FIG. 9 shows one block for each of processor 902, memory 904, I/O interface 906, and software blocks 908 and 910. These blocks may represent one or more processors, processing devices, or processing circuitries, operating systems, memories, I/O interfaces, applications, and/or software engines. In other implementations, device 900 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 900, e.g., processor(s) 902, memory 904, and I/O interface 906. An operating system, software and applications suitable for the user device can be provided in memory and used by the processor. The I/O interface for a user device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 914, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 620, 800, etc.) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
obtaining a three-dimensional (3D) model of an object, wherein the 3D model includes a mesh comprising a plurality of points each associated with a respective 3D coordinate and a texture, wherein the texture is applied to the mesh to render the object for display;
encoding the mesh into a mesh feature vector using a first neural network;
encoding the texture into a texture feature vector using a second neural network;
computing a mesh distance between the mesh feature vector and a reference mesh feature vector of a reference object;
computing a texture distance between the texture feature vector and a reference texture feature vector of the reference object;
determining, based on the mesh distance and the texture distance, whether the object matches the reference object;
classifying the object as a dissimilar object if the object does not match the reference object; and
classifying the object as a similar object if the object matches the reference object.

2. The computer-implemented method of claim 1, wherein the first neural network includes an input layer, a plurality of convolution layers, and one or more fully-connected (FC) layers, wherein encoding the mesh comprises providing the mesh as input at the input layer, and wherein the mesh feature vector is obtained as output of a final FC layer of the one or more FC layers.

3. The computer-implemented method of claim 2, wherein providing the mesh as input at the input layer comprises providing the 3D coordinates of the plurality of points to the input layer and wherein a number of nodes of the input layer is equal to a number of the plurality of points.

4. The computer-implemented method of claim 1, wherein the mesh feature vector is agnostic to operations that do not alter a shape of the mesh.

5. The computer-implemented method of claim 4, wherein the operations comprise one or more of: triangulation, resolution, rotation, translation, scale, subdivision, decimation, and combinations thereof.

6. The computer-implemented method of claim 1, wherein the texture is a two-dimensional (2D) image, and wherein the second neural network comprises a plurality of layers, and wherein the texture feature vector is obtained from a pre-final layer of the plurality of layers, and wherein a final layer of the second neural network is configured to output a classification for the texture.

7. The computer-implemented method of claim 1, wherein the first neural network comprises a mesh classifier, the method further comprising training the mesh classifier, wherein training the mesh classifier comprises:

providing, as input to the mesh classifier, training data that includes a plurality of reference meshes of training objects and a respective set of labels of different classes associated with each training object;

for each training object:

generating, based on the mesh of the training object and by the mesh classifier, a respective mesh feature vector;

generating, based on the mesh feature vector, one or more predicted labels for the training object; and computing a loss value based on comparison of the one or more predicted labels with the respective set of labels associated with the training object; and adjusting one or more parameters of the mesh classifier based on the loss values.

8. The computer-implemented method of claim 1, wherein determining whether the object matches the reference object comprises calculating an aggregate score based on the mesh distance and the texture distance.

9. The computer-implemented method of claim 1, wherein the object is classified as the similar object, and wherein the method further comprises comparing a storage footprint of the object and the reference object, and storing, on a storage device of a virtual experience platform, one of the object and the reference object, based on their respective storage footprint.

10. The computer-implemented method of claim 1, wherein the object is received from a user account of a virtual experience platform, and wherein subsequent to classifying the object as the similar object, the method further comprises transmitting a message to a device associated with the user account, wherein the message is indicative of similarity of the object to the reference object.

11. A non-transitory computer-readable medium with instructions stored thereon that, responsive to execution by a processing device, cause the processing device to perform operations comprising:

obtaining a three-dimensional (3D) model of an object, wherein the 3D model includes a mesh comprising a plurality of points each associated with a respective 3D coordinate and a texture, wherein the texture is applied to the mesh to render the object for display;

encoding the mesh into a mesh feature vector using a first neural network;

encoding the texture into a texture feature vector using a second neural network;

computing a mesh distance between the mesh feature vector and a reference mesh feature vector of a reference object;

computing a texture distance between the texture feature vector and a reference texture feature vector of the reference object;

determining, based on the mesh distance and the texture distance, whether the object matches the reference object;

classifying the object as a dissimilar object if the object does not match the reference object; and classifying the object as a similar object if the object matches the reference object.

12. The non-transitory computer-readable medium of claim 11, wherein the first neural network includes an input layer, a plurality of convolution layers, and one or more fully-connected (FC) layers, wherein encoding the mesh comprises providing the mesh as input at the input layer, and wherein the mesh feature vector is obtained as output of a final FC layer of the one or more FC layers.

13. The non-transitory computer-readable medium of claim 12, wherein providing the mesh as input at the input layer comprises providing the 3D coordinates of the plurality of points to the input layer, and wherein a number of nodes of the input layer is equal to a number of the plurality of points.

14. The non-transitory computer-readable medium of claim 11, wherein the object is received from a user account of a virtual experience platform, and wherein subsequent to classifying the object as the similar object, the operations further comprise transmitting a message to a device associated with the user account, wherein the message is indicative of similarity of the object to the reference object.

15. The non-transitory computer-readable medium of claim 11, wherein the texture is a two-dimensional (2D) image, and wherein the second neural network comprises a plurality of layers, and wherein the texture feature vector is obtained from a pre-final layer of the plurality of layers, and wherein a final layer of the second neural network is configured to output a classification for the texture.

16. A system comprising:

a memory with instructions stored thereon; and a processing device, coupled to the memory, the processing device configured to access the memory and execute the instructions, wherein the instructions cause the processing device to perform operations comprising:

obtaining a three-dimensional (3D) model of an object, wherein the 3D model includes a mesh comprising a plurality of points each associated with a respective 3D coordinate and a texture, wherein the texture is applied to the mesh to render the object for display;

encoding the mesh into a mesh feature vector using a first neural network;

encoding the texture into a texture feature vector using a second neural network;

computing a mesh distance between the mesh feature vector and a reference mesh feature vector of a reference object;

computing a texture distance between the texture feature vector and a reference texture feature vector of the reference object;

determining, based on the mesh distance and the texture distance, whether the object matches the reference object;

classifying the object as a dissimilar object if the object does not match the reference object; and classifying the object as a similar object if the object matches the reference object.

17. The system of claim 16, wherein the first neural network includes an input layer, a plurality of convolution layers, and one or more fully-connected (FC) layers, wherein encoding the mesh comprises providing the mesh as input at the input layer, and wherein the mesh feature vector is obtained as output of a final FC layer of the one or more FC layers.

18. The system of claim 17, wherein providing the mesh as input at the input layer comprises providing the 3D coordinates of the plurality of points to the input layer, and wherein a number of nodes of the input layer is equal to a number of the plurality of points.

19. The system of claim 16, wherein the object is classified as the similar object, and wherein the operations further comprise comparing a storage footprint of the object and the reference object, and storing, on a storage device of a virtual experience platform, one of the object and the reference object, based on their respective storage footprint.

20. The system of claim 16, wherein the texture is a two-dimensional (2D) image, and wherein the second neural network comprises a plurality of layers, and wherein the texture feature vector is obtained from a pre-final layer of the plurality of layers, and wherein a final layer of the second neural network is configured to output a classification for the texture.

* * * * *